US012748598B2

(12) United States Patent
Oshiyama

(10) Patent No.: US 12,748,598 B2
(45) Date of Patent: Sep. 29, 2026

(54) ARITHMETIC PROCESSING APPARATUS WHICH EXECUTES PLURALITY OF INSTRUCTIONS IN PARALLEL AND SEQUENTIALLY FROM EXECUTABLE INSTRUCTIONS AND METHOD FOR ARITHMETIC PROCESSING

(71) Applicant: Fujitsu Limited, Kawasaki (JP)

(72) Inventor: Gen Oshiyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 170 days.

(21) Appl. No.: 18/100,190

(22) Filed: Jan. 23, 2023

(65) Prior Publication Data

US 2023/0315446 A1 Oct. 5, 2023

(30) Foreign Application Priority Data

Mar. 30, 2022 (JP) ................................ 2022-055143
Dec. 8, 2022 (JP) ................................ 2022-196251

(51) Int. Cl.
*G06F 9/38* (2018.01)

(52) U.S. Cl.
CPC .......... *G06F 9/3826* (2013.01); *G06F 9/3838* (2013.01); *G06F 9/3867* (2013.01)

(58) Field of Classification Search
CPC ..... G06F 9/3838; G06F 9/3826; G06F 9/3828
See application file for complete search history.

(56) References Cited

U.S. PATENT DOCUMENTS

| | | | | |
|---|---|---|---|---|
| 5,944,811 | A | 8/1999 | Motomura | |
| 10,514,925 | B1 * | 12/2019 | Reynolds | G06F 9/4843 |
| 2003/0182536 | A1 * | 9/2003 | Teruyama | G06F 9/3838 712/225 |
| 2005/0060518 | A1 * | 3/2005 | Augsburg | G06F 9/3836 712/E9.05 |
| 2006/0095732 | A1 * | 5/2006 | Tran | G06F 9/3826 712/E9.046 |
| 2007/0204135 | A1 * | 8/2007 | Jiang | G06F 9/3824 712/E9.046 |

(Continued)

FOREIGN PATENT DOCUMENTS

| | | | |
|---|---|---|---|
| JP | H10-078872 | A | 3/1998 |
| JP | 2015-232902 | A | 12/2015 |

OTHER PUBLICATIONS

Office Action dated Jun. 9, 2026, issued in counterpart JP Application No. 2022-196251, with English translation. (6 pages).

*Primary Examiner* — Courtney P Spann
(74) *Attorney, Agent, or Firm* — WHDA, LLP

(57) ABSTRACT

An arithmetic processing apparatus includes a queue and control circuitry, and executes a plurality of instructions in parallel and sequentially from executable instructions. In the arithmetic processing apparatus, the queue stores the plurality of instructions, and the control circuitry holds an indicator indicating a pipeline that executes a producer instruction included in the plurality of instructions and an execution stage of the producer instruction in the pipeline, executes data dependency resolution between the producer instruction and a consumer instruction that uses an execution result of the producer instruction and that is included in the plurality of instructions, and controls issuing timings of the plurality of instructions.

14 Claims, 25 Drawing Sheets

(56) References Cited

U.S. PATENT DOCUMENTS

| | | | | |
|---|---|---|---|---|
| 2009/0276608 | A1* | 11/2009 | Shimada | G06F 9/3861 712/216 |
| 2013/0298127 | A1 | 11/2013 | Meier et al. | |
| 2013/0326197 | A1* | 12/2013 | Brown | G06F 9/3836 712/214 |
| 2014/0013089 | A1 | 1/2014 | Henry et al. | |
| 2014/0129805 | A1* | 5/2014 | Husby | G06F 9/3826 712/214 |
| 2014/0281431 | A1* | 9/2014 | Iyengar | G06F 9/3838 712/226 |
| 2020/0183684 | A1* | 6/2020 | Oshiyama | G06F 9/3836 |
| 2021/0089312 | A1* | 3/2021 | Kothinti Naresh | G06F 9/3867 |
| 2023/0118428 | A1* | 4/2023 | Mirkes | G06F 9/3867 712/216 |

* cited by examiner

FIG.3

A

| No | instruction | cycle | 1 | 2 | 3 | 4 | 5 | 6 | | |
|---|---|---|---|---|---|---|---|---|---|---|
| | | | M3 | M2 | M1 | LX | P1 | | | |
| 1 | add: r0 <= r1 + r2 | | P | B | F | X1 | W | | | |
| | | | | | | | | | | |
| 2 | add: r3 <= r0 + r2 | | <-> | P | B | F | X1 | | | |

B

| No | instruction | cycle | 1 | 2 | 3 | 4 | 5 | 6 | 7 |
|---|---|---|---|---|---|---|---|---|---|
| | | | | M3 | M2 | M1 | LX | | |
| 1 | mul: r0 <= r1 * r2 | | P | B | F | X1 | X2 | | |
| | | | | | | | | | |
| 2 | mul: r3 <= r0 * r2 | | | <-> | P | B | F | X1 | X2 |

C

| stage | function |
|---|---|
| P | issue |
| B | register read |
| F | operand forwarding |
| Xn | execution |
| LX | Last Xn cycle |
| (LX)Mm | LX minus m cycles |
| (LX)Pp | LX plus p cycles |
| W | register write |

FIG.7 example of pipeline stage information 207

| [5:3] | [2:0] |
| --- | --- |
| pipeline id | stage id(counter) |

209 208

FIG.12

A

| No | instruction | cycle | 1 | 2 | 3 | 4 | 5 | 6 | 7 | 8 |
|---|---|---|---|---|---|---|---|---|---|---|
| | | | M3 | M2 | M1 | LX | P1 | P2 | | |
| 1 | add: r0 <= r1 + r2 | | P | B | F | X1 | W | | | |
| | | | | <-> | | | | | | |
| 2 | add: r3 <= r0 + r2 | | <-> | P | B | F | X1 | | | |
| | | | | | <-> | | | | | |
| 3 | add: r3 <= r0 + r2 | | <-> | | P | B | F | X1 | | |
| | | | | | | <-> | | | | |
| 4 | add: r3 <= r0 + r2 | | <-> | | | P | B | F | X1 | |
| | | | | | | | | | | |
| 5 | add: r3 <= r0 + r2 | | <-> | | | | P | B | F | X1 |

B

| stage | function |
|---|---|
| P | issue |
| B | register read |
| F | operand forwarding |
| Xn | execution |
| LX | Last Xn cycle |
| (LX)Mm | LX minus m cycles |
| (LX)Pp | LX plus p cycles |
| W | register write |

instruction 2: instruction 1 B stage==op1 forward LX of P stage instruction 1 to F (------- )
instruction 3: instruction 1 F stage==op1 forward LXP1 of P stage instruction 1 to F (-·-·-)
instruction 4: instruction 1 X1 stage==op1 forward LXP2 of P stage instruction 1 to F (········)
instruction 5 and later: not any of the above, through register

FIG.13

A

| No | instruction | cycle | 1 | 2 | 3 | 4 | 5 | 6 | 7 | 8 |
|---|---|---|---|---|---|---|---|---|---|---|
| | | | M3 | M2 | M1 | LX | P1 | P2 | | |
| 1 | add: r0 <= r1 + r2 | | P | B | F | X1 | W | | | |
| | | | | <-> | | | | | | |
| | **stage_id** | | **<->** | **1** | **2** | **3** | **0** | **0** | **0** | **0** |
| 2 | add: r3 <= r0 + r2 | | <-> | P | B | F | X1 | | | |
| 3 | add: r3 <= r0 + r2 | | <-> | | P | B | F | X1 | | |
| 4 | add: r3 <= r0 + r2 | | <-> | | | P | B | F | X1 | |
| | | | | | | | | | | |
| 5 | add: r3 <= r0 + r2 | | <-> | | | | P | B | F | X1 |

B

| stage | function |
|---|---|
| P | issue |
| B | register read |
| F | operand forwarding |
| Xn | execution |
| LX | Last Xn cycle |
| (LX)Mm | LX minus m cycles |
| (LX)Pp | LX plus p cycles |
| W | register write |

instruction 2: P stage stage_id==1 forward LX of instruction 1 to F (-------)
instruction 3: P stage stage_id==2 forward LXP1 of instruction 1 to F (-·-·-)
instruction 4: P stage stage_id==3 forward LXP2 of instruction 1 to F (········)
instruction 5 and later: P stage stage_id==0, through register

FIG.14

A

| No | instruction | cycle | 1 | 2 | 3 | 4 | 5 | 6 | 7 | 8 | 9 | 10 | 11 |
|---|---|---|---|---|---|---|---|---|---|---|---|---|---|
| | | | | | | M3 | M2 | M1 | LX | | | | |
| 1 | fma: v0 <= v1 * v2 + v3 | | P | B | F | X1 | X2 | X3 | X4 | | | | |
| | | | | | | **M5** | M4 | M3 | M2 | M1 | LX | | |
| 2 | fma: v4 <= v5 * v6 + v7 | | | | P | B | F | X1 | X2 | X3 | X4 | | |
| | | | | | | | | | | | | | |
| 3 | fma: v8 <= v0 * v1 + v4 | | | | | <-> | P | B | F | X1 | X2 | X3 | X4 |

B

| stage | function |
|---|---|
| P | issue |
| B | register read |
| F | operand forwarding |
| Xn | execution |
| LX | Last Xn cycle |
| (LX)Mm | LX minus m cycles |

C

| | | |
|---|---|---|
| FMA | X1 | multiply |
| | X2 | multiply |
| | X3 | accumulate |
| | X4 | accumulate |

FIG.15

| No | instruction | cycle | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| | | | | M5 | M4 | M3 | M2 | M1 | LX | P1 | P2 | | | | | | | |
| 1 | fma: v0 <= v1 * v2 + v3 | | P | B | F | X1 | X2 | X3 | X4 | W | | | | | | | | |
| | | | | | | M5 | M4 | M3 | M2 | M1 | LX | P1 | P2 | | | | | |
| 2 | fma: v4 <= v5 * v6 + v7 | | | | P | B | F | X1 | X2 | X3 | X4 | W | | | | | | |
| | | | | | | | | | | | | | | | | | | |
| | **op1 stage_id** | | | | | **<->** | **1** | **2** | **3** | **0** | **0** | **0** | **0** | | | | | |
| | **op3 stage_id** | | | | | **<->** | **1** | **2** | **3** | **4** | **5** | **0** | **0** | | | | | |
| 3 | fma: v8 <= v0 * v1 + v4 | | | | | <-> | P | B | F | X1 | X2 | X3 | X4 | | | | | |
| 4 | fma: v8 <= v0 * v1 + v4 | | | | | <-> | | P | B | F | X1 | X2 | X3 | X4 | | | | |
| 5 | fma: v8 <= v0 * v1 + v4 | | | | | <-> | | | P | B | F | X1 | X2 | X3 | X4 | | | |
| | | | | | | | | | | | | | | | | | | |
| 6 | fma: v8 <= v0 * v1 + v4 | | | | | <-> | | | | P | B | F | X1 | X2 | X3 | X4 | | |
| 7 | fma: v8 <= v0 * v1 + v4 | | | | | <-> | | | | | P | B | F | X1 | X2 | X3 | X4 | |
| 8 | fma: v8 <= v0 * v1 + v4 | | | | | <-> | | | | | | P | B | F | X1 | X2 | X3 | X4 |

Instruction 3: op1_stage_id ==1 forward LX of instruction 1 to F op1, op3_stage_id==1 forward LX of instruction 2 to X2 op3
Instruction 4: op1_stage_id ==2 forward LXP1 of instruction 1 to F op1, op3_stage_id==2 forward LXP1 of instruction 2 to X2 op3
Instruction 5: op1_stage_id ==3 forward LXP1 of instruction 1 to F op1, op3_stage_id==3 forward LX of instruction 2 to F op3
Instruction 6: op1_stage_id ==0 op1, through register, op3_stage_id==4 forward LXP1 of instruction 2 to F op3
Instruction 7: op1_stage_id ==0 op1, through register, op3_stage_id==5 forward LXP2 of instruction 2 to F op3
instruction 8 and later: op1 op3 through register

FIG.17

A

| No | instruction | cycle | 1 | 2 | 3 | 4 | 5 | 6 | 7 |
|---|---|---|---|---|---|---|---|---|---|
| 1 | load: r0 <= [r1] | | L | R | M | T | W | | |
| | | | <-> | | | <-> | | | |
| 2 | add: r3 <= r0 + r2 | | <-> | P | B | F | X1 | | |
| 3 | add: r4 <= r0 + r2 | | <-> | | P | B | F | X1 | |
| 4 | add: r4 <= r0 + r2 | | <-> | | | P | B | F | X1 |
| 5 | add: r4 <= r0 + r2 | | <-> | | | <-> | | | |
| | | | | <-> | | <-> | | | |
| 6 | add: r5 <= r3 + r3 | | | <-> | P | B | F | X1 | |
| 7 | add: r5 <= r3 + r3 | | | <-> | | P | B | F | X1 |
| 8 | add: r5 <= r3 + r3 | | | <-> | | <-> | | | |

B

| stage | function |
|---|---|
| L | Load pipeline issue |
| R | RAM read |
| M | tag match/select |
| T | Data arrival/miss |
| W | regwrite |

Cancel_code (load pipeline, one case)

P stage[3:1]

3: P==producer instruction load (instruction 1) T timing
2: P==producer instruction load (instruction 1) M timing (B==T)
1: P==producer instruction load (instruction 1) R timing (F==T)
0: P is producer instruction load (instruction 1) later than T timing (unnecessary because of not being issued from scheduler)

B stage[2:0]

2: B==producer instruction load (instruction 1) T timing
1: B==producer instruction load (instruction 1) M timing (F==T)
0: B is producer instruction load (instruction 1) later than T timing, miss is fixed

F stage[1:0]

1: F==producer instruction load (instruction 1) T timing
0: F is producer instruction load (instruction 1) later than T timing, miss is fixed

FIG.19

A

| [5:3] | [2:0] |
|---|---|
| pipeline id | stage id(counter) |

B example of allocation of pipeline id[5:3] representing pipeline of preceding instruction

| | |
|---|---|
| LDR0 | id[5:3]==0 |
| LDR1 | id[5:3]==1 |
| FXU0 | id[5:3]==2 |
| FXU1 | id[5:3]==3 |
| FLU0: | id[5:3]==4 |
| FLU1: | id[5:3]==5 |

C example of allocation of stage id[5:3]

for arithmetic pipeline

| | |
|---|---|
| LXM3 and before | id[2:0]==0(not issued) |
| LXM2 | id[2:0]==1 |
| LXM1 | id[2:0]==2 |
| LX | id[2:0]==3 |
| LXP1 and after | id[2:0]==0(through register) |

D for load pipeline

| | |
|---|---|
| L and before | id[2:0]==0(not issued) |
| R | id[2:0]==1 |
| M | id[2:0]==2 |
| T | id[2:0]==3 |
| W and after | id[2:0]==0(through register) |

FIG.21

A

| No | instruction | cycle | 1 | 2 | 3 | 4 | 5 | 6 | 7 | 8 |
|---|---|---|---|---|---|---|---|---|---|---|
| 1 | load: r0 <= [r1] | | L | R | M | T | W | | | |
| | | | <-> | | | <-> | | | | |
| | **op1 stage_id(pipeline_id=load)** | | **<->** | **1** | **2** | **3** | **0** | **0** | **0** | **0** |
| 2 | add: r3 <= r0 + r2 | | <-> | P | B | F | X1 | | | |
| 3 | add: r4 <= r0 + r2 | | <-> | | P | B | F | X1 | | |
| 4 | add: r4 <= r0 + r2 | | <-> | | | P | B | F | X1 | |
| 5 | add: r4 <= r0 + r2(not canceled) | | <-> | | | | P | B | F | X1 |
| 5 | add: r4 <= r0 + r2(canceled) | | <-> | | | <-> | | | | |
| | **Op1 stage_id(pipeline_id=exec)** | | | **<->** | **1** | **2** | **3** | **0** | **0** | **0** |
| 6 | add: r5 <= r3 + r3 | | | <-> | P | B | F | X1 | | |
| 7 | add: r5 <= r3 + r3 | | | <-> | | P | B | F | X1 | |
| 8 | add: r5 <= r3 + r3 | | | <-> | | <-> | | | | |

B

| stage | function |
|---|---|
| L | Load pipeline issue |
| R | RAM read |
| M | tag match/select |
| T | Data arrival/miss |
| W | regwrite |

Cancel_code (load pipeline, one case)

P stage[3:1]
3: P==producer instruction load (instruction 1) T timing
2: P==producer instruction load (instruction 1) M timing (B==T)
1: P==producer instruction load (instruction 1) R timing (F==T)
0: P is producer instruction load (instruction 1) later than T timing (unnecessary because of not being issued from scheduler)

B stage[2:0]
2: B==producer instruction load (instruction 1) T timing
1: B==producer instruction load (instruction 1) M timing (F==T)
0: B is producer instruction load (instruction 1) later than T timing, miss is fixed

F stage[1:0]
1: F==producer instruction load (instruction 1) T timing
0: F is producer instruction load (instruction 1) later than T timing, miss is fixed

FIG.23

A

| No | instruction | cycle | 1 | 2 | 3 | 4 | 5 | 6 | 7 | 8 | 9 | 10 |
|---|---|---|---|---|---|---|---|---|---|---|---|---|
| | | | M3 | M2 | M1 | LX | P1 | P2 | P3 | | | |
| 1 | cmp: r0, r1 | | P | B | F | X1 | | | | | | |
| | | | | | | | | | | | | |
| 2 | addeq: r4 <= r2 + r3 | | C | P | B | F | X1 | | | | | |
| 3 | addeq: r4 <= r2 + r3 | | | C | P | B | F | X1 | | | | |
| 4 | addeq: r4 <= r2 + r3 | | | | C | P | B | F | X1 | | | |
| 5 | addeq: r4 <= r2 + r3 | | | | | C | P | B | F | X1 | | |
| 6 | addeq: r4 <= r2 + r3 | | | | | | C | P | B | F | X1 | |
| | | | | | | | | | | | | |
| 7 | addeq: r4 <= r2 + r3 | | | | | | | C | P | B | F | X1 |

B

| stage | function |
|---|---|
| C | inflight conditional flag read |
| P | issue |
| B | register read |
| F | operand forwarding |
| Xn | execution |
| LX | Last Xn cycle |
| (LX)Mm | LX minus m cycles |
| (LX)Pp | conditional flag return |

instruction 1 -> instructions 2-5 timings are forwarding
instruction 1 -> instruction 6 timing
instruction 1 -> instruction 7 timing and after are inflight conditional flag read

FIG.25

A

| No | instruction | cycle | 1 | 2 | 3 | 4 | 5 | 6 | 7 | 8 | 9 | 10 |
|---|---|---|---|---|---|---|---|---|---|---|---|---|
| | | | M3 | M2 | M1 | LX | P1 | P2 | P3 | | | |
| 1 | cmp: r0, r1 | | P | B | F | X1 | | | | | | |
| | | | | | | | | | | | | |
| | **stage info** | | **<->** | **1** | **2** | **3** | **4** | **0** | **0** | **0** | | |
| 2 | addeq: r4 <= r2 + r3 | | C | P | B | F | X1 | | | | | |
| 3 | addeq: r4 <= r2 + r3 | | | C | P | B | F | X1 | | | | |
| 4 | addeq: r4 <= r2 + r3 | | | | C | P | B | F | X1 | | | |
| 5 | addeq: r4 <= r2 + r3 | | | | | C | P | B | F | X1 | | |
| 6 | addeq: r4 <= r2 + r3 | | | | | | C | P | B | F | X1 | |
| | | | | | | | | | | | | |
| 7 | addeq: r4 <= r2 + r3 | | | | | | | C | P | B | F | X1 |

B

| stage | function |
|---|---|
| C | inflight conditional flag read |
| P | issue |
| B | register read |
| F | operand forwarding |
| Xn | execution |
| LX | Last Xn cycle |
| (LX)Mm | LX minus m cycles |
| (LX)Pp | conditional flag return |

instruction 1 -> instructions 2-5 timings are forwarding
instruction 1 -> instruction 6 timing
instruction 1 -> instruction 7 timing and after are inflight conditional flag read

ARITHMETIC PROCESSING APPARATUS WHICH EXECUTES PLURALITY OF INSTRUCTIONS IN PARALLEL AND SEQUENTIALLY FROM EXECUTABLE INSTRUCTIONS AND METHOD FOR ARITHMETIC PROCESSING

CROSS-REFERENCE TO RELATED APPLICATION

This application is based upon and claims the benefit of priority of the prior Japanese Patent application No. 2022-055143, filed on Mar. 30, 2022, and the Japanese Patent application No. 2022-196251, filed on Dec. 8, 2022, the entire contents of which are incorporated herein by reference.

FIELD

The embodiment discussed herein relates to an arithmetic processing apparatus and a method for arithmetic processing.

BACKGROUND

An improvement of the performance of micro-architecture in a core (processor core) of a processor means an improvement in IPC (Instruction Per Cycle) in the same operating frequency band. As architecture for improving an IPC, a superscalar, an out-of-order (OoO; Out of Order) execution, and the like are used.

A superscalar processor includes multiple pipelines including arithmetic operators such as Arithmetic Logic Units (ALUs), and with this configuration, executes instructions as many as the number of pipelines in one cycle.

The out-of-order execution is a method for executing, in a processor, instructions in parallel and sequentially from executable instructions (out of order) among multiple instructions that have been issued (dispatched). Examples of an executable instruction includes an instruction having no dependency with another instruction, an instruction having resolved the dependency with another instruction, and an instruction that can be allocated to hardware to be used.

A processor that can deal with out-of-order execution includes a scheduler that detects executable instructions and issues the detected instructions to a pipeline. For example, the scheduler includes, for each pipeline, a comparator that makes a timing determination as to whether it is the dependency resolution timing (whether the instruction is executable).

[Patent Document 1]Japanese Laid-open Patent Publication No. HEI10-078872

[Patent Document 2] Japanese Laid-open Patent Publication No. 2015-232902

In a processor that can deal with out-of-order execution, as the number of instructions that can be issued out-of-order (inflight instruction width) increases, the number of entries in the scheduler increases and the circuit scale of the comparator also increases. Furthermore, when the number of pipelines is doubled, the number of comparators is also doubled.

As described above, it may be difficult to achieve both improvement in IPC due to enhancement performance of the processor core and reduction in circuit scale of the processor core (in other words, highly integration).

SUMMARY

According to an aspect of the embodiments, an arithmetic processing apparatus includes a queue and control circuitry. The arithmetic processing apparatus executes a plurality of instructions in parallel and sequentially from executable instructions. In the arithmetic processing apparatus, the queue stores the plurality of instructions, and the control circuitry holds an indicator indicating a pipeline that executes a producer instruction included in the plurality of instructions and an execution stage of the producer instruction in the pipeline, executes data dependency resolution between the producer instruction and a consumer instruction that uses an execution result of the producer instruction and that is included in the plurality of instructions, and controls issuing timings of the plurality of instructions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a stage of a pipeline and data forwarding according to latency;

FIG. 7 is a diagram illustrating an example of pipeline stage information;

FIG. 12 is a diagram illustrating an example of determining a forwarding timing according to the comparative example;

FIG. 13 is a diagram illustrating an example of determining a forwarding timing according to the one embodiment;

FIG. 14 is a diagram illustrating an example of determining in a case with two shortest forwarding timings according to the comparative example;

FIG. 15 is a diagram illustrating an example of determining in a case with two shortest forwarding timings according to the one embodiment;

FIG. 17 is a diagram illustrating an example of determining in a canceling process of a subsequent instruction in a dependency chain of a cache-miss load according to the comparative example;

FIG. 19 is a diagram for explaining an example of allocation of pipeline stage information according to the one embodiment;

FIG. 21 is a diagram illustrating an example of determining in a canceling process of a subsequent instruction in a dependency chain of a cache-miss load according to the one embodiment;

FIG. 23 is a diagram illustrating an example of determining in the CP updating control according to the comparative example;

FIG. 25 is a diagram illustrating an example of determining in the CP updating control according to the one embodiment.

DESCRIPTION OF EMBODIMENT(S)

Figure 1:
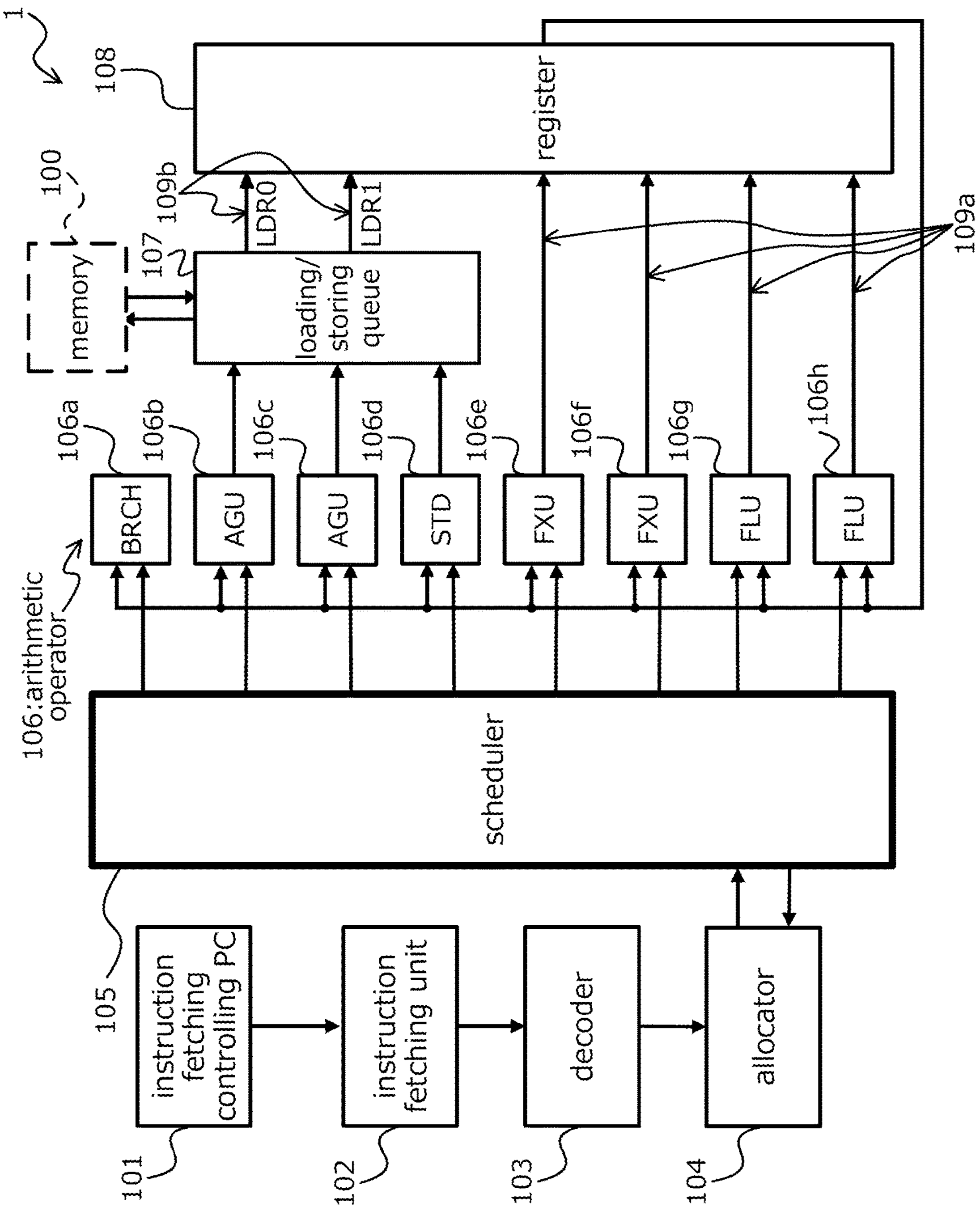
FIG. 1 is a block diagram illustrating an example of a configuration of a processor according to one embodiment.

Hereinafter, an embodiment of the present disclosure will now be described with reference to the drawings. However, the embodiment described below is merely illustrative and there is no intention to exclude the application of various modifications and techniques that are not explicitly described in the embodiment. For example, the present embodiment can be variously modified and implemented without departing from the scope thereof. In the drawings used in the following description, the same reference numerals denote the same or similar parts unless otherwise specified.

(1) One Embodiment

(1-1) Example of Configuration of Processor

FIG. 1 is a block diagram illustrating an example of a configuration of a processor 1 according to one embodiment. For the purpose of the simplification, FIG. 1 illustrates part of the circuit configuration of the core of the processor 1.

The processor 1 is an example of an arithmetic processing apparatus such as a CPU (Central Processing Unit) that executes multiple instructions in parallel and sequentially from executable instructions. For example, the processor 1 may be a superscalar processor that can deal with out-of-order execution, which is an example of a process that executes multiple instructions in parallel and sequentially from executable instructions.

As illustrated in FIG. 1, the processor 1 may be provided with an instruction fetching controlling PC (Program Counter) 101, an instruction fetching unit 102, a decoder 103, an allocator 104, and a scheduler 105. The processor 1 may further include multiple arithmetic operators 106, a loading/storing queue 107, and a register 108.

The instruction fetching controlling PC 101 is a program counter that stores the address (the address of the main storage, e.g., memory 100) where the instruction to be executed next is stored. The instruction fetching unit 102 fetches an instruction from the address indicated by the instruction fetching controlling PC 101. The decoder 103 decodes an instruction fetched by the instruction fetching unit 102. The allocator 104 allocates, to the decoded instruction, resource that is to execute the decoded instruction and is exemplified by one of the multiple arithmetic operators 106, and issues (dispatches) the instruction to the scheduler 105.

The scheduler 105 issues the instruction dispatched by the allocator 104 to the arithmetic operator 106 allocated by the allocator 104. Note that issuing of an instruction from the allocator 104 to the scheduler 105 may be referred to as "dispatching", and issuing of an instruction from the scheduler 105 to the arithmetic operator 106 may be referred to as "issuing".

The scheduler 105 includes, for example, a queue that receives and accumulates instructions dispatched from the allocator 104 in the programmed order (i.e., in-order). The scheduler 105 issues, to the arithmetic operator 106, instructions that each have resolved the dependency with another instruction out of order.

Each of the multiple arithmetic operators 106 executes an instruction issued to itself from the scheduler 105 and writes the execution result into the register 108. The multiple arithmetic operators 106 may include arithmetic operators 106*a* to 106*h*. The arithmetic operator (BRCH) 106*a* is an arithmetic operator that executes a branch instruction. The arithmetic operators (AGUs) 106*b* and 106*c* are each an arithmetic operator that executes an address generation instruction. The arithmetic operator (STD) 106*d* is an arithmetic operator that executes the transmission of stored data. The arithmetic operators (FXUs) 106*e* and 106*f* are each an arithmetic operator that executes a fixed-point arithmetic instruction. The arithmetic operators (FLUs) 106*g* and 106*h* are each an arithmetic operator that executes floating-point arithmetic instruction.

The loading/storing queue 107 is a queue that stores data to be loaded or stored into the register 108 or the memory 100 when the arithmetic operators 106*b* to 106*d* execute instructions.

The register 108 is used by the multiple arithmetic operators 106 to execute instructions. The memory 100 is a main storing device, such as, a DIMM (Dual Inline Memory Module).

In the processor 1, multiple arithmetic pipelines 109*a* and multiple loading pipelines 109*b* are formed. Hereinafter, the arithmetic pipelines 109*a* and the loading pipelines109*b* may be simply referred to as arithmetic pipes 109*a* and loading pipes 109*b*. Every arithmetic pipeline 109*a* includes an arrow from the scheduler 105 to the arithmetic operator 106, an arrow indicating register reading (corresponding to a register reading port) from the register 108 to the arithmetic operator 106, and an arrow indicating register writing (corresponding to a register writing port) from the arithmetic operator 106 into the register 108. Multiple loading pipelines 109*b* are LDR0 and LDR1 in the example of FIG. 1.

Although, in FIG. 1, one register reading port is connected to each arithmetic operator 106, one arrow does not always indicate one operand, and multiple operands such as two or three operands are represented as one line (wire). In practice, a register reading port may include at least lines as many as the product of the bit width (64 bits for a fixed-point, and the SIMD width for a floating-point) and the number of operands.

The scheduler 105 has the same number of issuing ports as the arithmetic pipelines 109*a*. Each arithmetic operator 106 or each path from an issuing port of the scheduler 105 to each arithmetic operator 106 may be referred to as a pipeline. In order to enable simultaneous writing and executing, the processor 1 prepares the same number of register writing ports as the number of pipelines of the arithmetic pipelines 109*a* and the loading pipelines 109*b* that carry out register writing. In other words, the number of register writing ports matches the number of the pipelines of the arithmetic pipelines 109*a* and the loading pipeline 109*b*.

Figure 2:
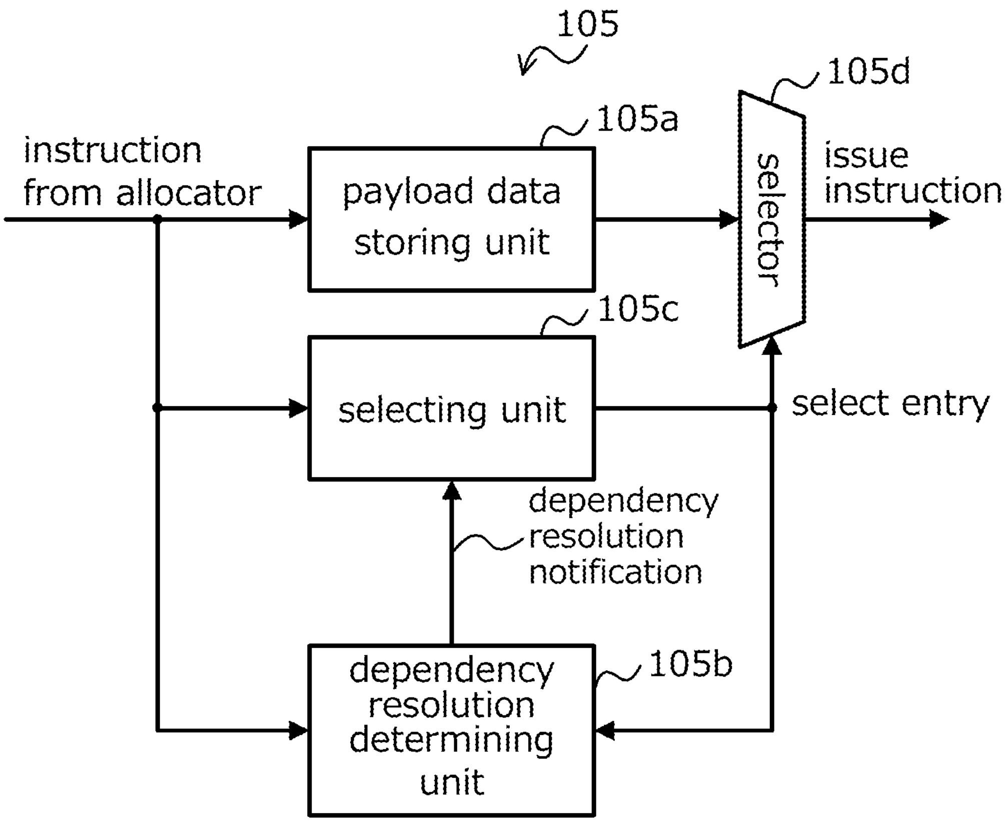
FIG. 2 is a block diagram illustrating an example of a configuration of a scheduler according to a comparative example.

(1-2) Example of Configuration of Processor Core According to Comparative Example FIG. 2 is a block diagram illustrating an example of a configuration of a scheduler 105 according to a comparative example. As illustrated in FIG. 2, the scheduler 105 according to the comparative example may include a payload data storing unit 105*a*, a dependency resolution determining unit 105*b*, a selecting unit 105*c*, and a selector 105*d*.

The payload data storing unit 105*a* stores payload data of an instruction (accepted instruction) dispatched from the allocator 104. A storing device that stores instructions and that includes the payload data storing unit 105*a* is an example of a queue of the scheduler 105.

The dependency resolution determining unit 105*b* resolves the dependency of instructions dispatched by the allocator 104. The dependency of instructions is, for example, a relationship in which a result (data) of the arithmetic operation of a first instruction is used in the arithmetic operation of a second instruction. The first instruction may be referred to as a "producer", "preceding instruction," or a "source instruction" and the second instruction may be referred to as a "consumer", a "subsequent instruction" or a "destination instruction."

For example, the dependency resolution determining unit 105*b* determines whether the dependency of data has been resolved, and when determining that the dependency has been resolved, issues, to the selector 105*c*, notification (dependency resolution notification) indicating which instruction is to be issued among the instructions whose dependency has been resolved. The notification may include, for example, information indicating an entry of an instruction in the queue of the scheduler 105. The dependency resolution may mean that the result of the arithmetic operation of the producer instruction is ready to be used in the arithmetic operation of the consumer instruction.

In response to the notification from dependency resolution determining unit 105*b*, the selecting unit 105*c* arbitrates, in the selector 105*d*, an instruction to be issued among the instructions whose dependency has been resolved. For example, the selecting unit 105*c* may determine the entry to be issued based on the entry indicated by the dependency resolution notification and information on the programmed order of instructions dispatched from the allocator 104. In addition, the selecting unit 105*c* may cause the selector 105*d* to select an entry of the queue of the payload data storing unit 105*a* and notify the selector 105*d* of the selected entry.

For example, if multiple subsequent instructions depending on a preceding instruction exist, the dependency resolution notification can be issued to multiple entries. The selecting unit 105*c* determines which instruction is to be issued from the scheduler 105 among the instructions whose dependency has been resolved.

The selector 105*d* issues an instruction to a pipeline in response to a selection (arbitration) by the selecting unit 105*c*. An "instruction" also includes data to be used by the arithmetic operators 106, such as payload data stored in the payload data storing unit 105*a*. For example, the selector 105*d* issues, to a pipeline, payload data of the entry selected by the selecting unit 105*c* from the payload data storing unit 105*a*.

The scheduler 105 may include the payload data storing unit 105*a* and the dependency resolution determining unit 105*b* for each individual entry. In addition, the scheduler 105 may include dependency resolution determining units 105*b* corresponding to the number (for example, "two", "three", or "four") of operands. In other words, one dependency resolution determining unit 105*b* may be provided for each entry and for each operand.

Although an associative scheme is used as the scheme (wakeup scheme) for determining a dependency resolution timing of an instruction in the queue of scheduler 105, the method is not limited to this and may alternatively be an indirect scheme or a direct scheme. All of these schemes are difficult to synthesize with an automatic synthesizer because these schemes use specialized circuitry such as a multi-port small-capacity RAM (Random Access Memory) or a CAM (Content Addressable Memory). For example, as these schemes, a standard cell (stdcell) that can be synthesized with an automatic synthesizer and consumes low power may be used.

Here, the dependency resolution determining unit 105*b* resolves data hazard between dependent instructions (i.e., the situation where the pipeline of a subsequent instruction is unable to proceed unless waiting for the result of an arithmetic operation of a preceding instruction) by forwarding control. The term "forwarding" may also be referred to as"bypassing". The scheduler 105 may include, for example, a forwarding unit 105*e* (see FIG. 4) for forwarding data within a pipeline, which is however omitted in FIG. 2.

FIG. 3 is a diagram illustrating an example of a stage of a pipeline and an example of data forwarding according to latency. The reference symbol A represents an example of a forwarding timing of an add instruction having latency of one cycle, and the reference symbol B represents an example of a forwarding timing of a mul instruction having latency of two cycles. The reference symbol C represents an example of the function of each stage. An add instruction (for example, add: r0<=r1+r2) is an arithmetic instruction that writes the sum of data (data of an operand 1) in a register r1 and data (data of an operand 2) in a register r2 into the register r0. A mul instruction (e.g., mul: r0<=r1*r2) is an arithmetic instruction that writes the product of data of the operand 1 in the register r1 and data of the operand 2 in the register r2 into the register r0.

A previous stage (hereinafter sometimes referred to as a "scheduler stage") to the P stage in the reference symbols A and B indicates that an instruction is present in the scheduler 105. In this stage, the dependency resolution determining unit 105*b* determines whether data of the preceding instruction is available (waits for a wakeup). For example, the dependency resolution determining unit 105*b* holds a wakeup bit (ready bit) for each operand (hereinafter, sometimes referred to as "OP"). All the wakeup bits being turned "on" means that data of all the operands is available. In this occasion, the dependency resolution determining unit 105*b* then wakes up a subsequent instruction (makes a subsequent instruction ready) by, for example, outputting dependency resolution notification of the subsequent instruction to the selecting unit 105*c*.

The P stage (see the reference symbol C) is a stage in which the scheduler 105 selects and issues the instruction when data of all operands becomes available.

The B stage is a stage in which a pipeline reads data in the register 108.

The F stage is a stage in which a pipeline reads (obtains) forwarded data (operand).

The X (Xn; n is an integer of one or more) stage is a stage in which the arithmetic operator 106 executes an arithmetic operation using data obtained in the B stage or the F stage, and is a stage that spans the arithmetic latency of the instruction, in other words, the number of cycles required to execute the instruction.

The W stage is a stage in which a result (data) of the arithmetic operation in the Xn stage is written into the register 108.

As a stage indicating a cycle, an LX (Last X) stage indicates the cycle of the last Xn stage. The Mm (or LXMm) stage is a stage m (where m is an integer of one or more) cycles earlier than the LX (LX minus m cycles). The Pp (or LXPp) stage is a stage p (where p is an integer of one or more) cycles later than the LX (LX plus p cycles).

The dependency resolution determining unit 105*b* forwards (bypasses) the result of the arithmetic operation of the preceding instruction to a stage (for example, the F stage) earlier than the Xn stage in the subsequent instruction.

For example, in the reference symbol A, since the operation latency of the instruction 1 (No. 1) is one, the dependency resolution determining unit 105*b* detects the dependency between the instruction 1 and the OP1 of the instruction 2 and, upon detecting that the add of the instruction 1 comes into the P stage, wakes up the instruction 2 (No. 2) in response to the detection. As a result, the scheduler 105 can forward the result of the arithmetic operation of X1 stage (fourth cycle) of the instruction 1 to the OP1 of the F stage (immediately before the X1 stage) of the instruction 2 that has dependency with the instruction 1.

In addition, since the operation latency of the instruction 1 is two in the reference symbol B, the dependency resolution determining unit 105*b* wakes up the instruction 2 upon detecting that mul of the instruction 1 comes into the B stage. Consequently, the scheduler 105 can forward the result of the arithmetic operation of X2 stage (fifth cycle) of the instruction 1 to the OP1 of the F stage (immediately before the X1 stage) of the instruction 2 that has dependency with the instruction 1.

As described above, when performing the forwarding control on the arithmetic latency of multiple cycles, the dependency resolution determining unit 105*b* determines how many cycles prior to the LX stage the subsequent instruction is to be waken up. For example, the dependency resolution determining unit 105*b* may commonly wake up a subsequent instruction two cycles earlier than LXM3 (two cycles earlier than the LX) in the cases of the reference symbols A and B. In the example of the reference symbol A, the LXM3 of the preceding instruction 1 having the operation latency one is the P stage, and in the example of the reference symbol B, the LXM3 of the preceding instruction 1 having the operation latency two is the B stage. In either case, forwarding is carried out at the shortest (earliest) timing by the wakeup in the LXM3.

In order to determine such a forwarding timing by the dependency resolution determining unit 105*b*, the scheduler 105 includes, for example, a comparator that compares values of PRAs (Physical Register Addresses) of the respective OPs of the subsequent instruction at the timing of the LXM3 of the preceding instruction. When detecting matching of PRAs in the comparator, the dependency resolution determining unit 105*b* wakes up a subsequent instruction. The comparator in the illustrated example is used to detect matching between IDs uniquely distinguishing respective instructions that are speculatively executed. A PRA is an example of a type of IDs. Therefore, a comparison target is not limited to a PRA. Further, the comparator detects matching using encoded IDs, but may alternatively retain IDs in a decoded form and detect matching of IDs by taking and-or between the decoded signal lines.

Since a queue to store an instruction does not exist between the scheduler 105 and each arithmetic operator 106, forwarding is performed before the arithmetic operator 106. This means that the scheduler 105 controls the timing of issuing an instruction and determines from which stage to forward.

In the following description, the term scheduler 105 shall refer to a range from a part (the selector 105*d* in the example of FIG. 2) outputting data from a queue of the scheduler 105, including the comparator, to a part controlling the timing and determining the forwarding stage.

Figure 4:
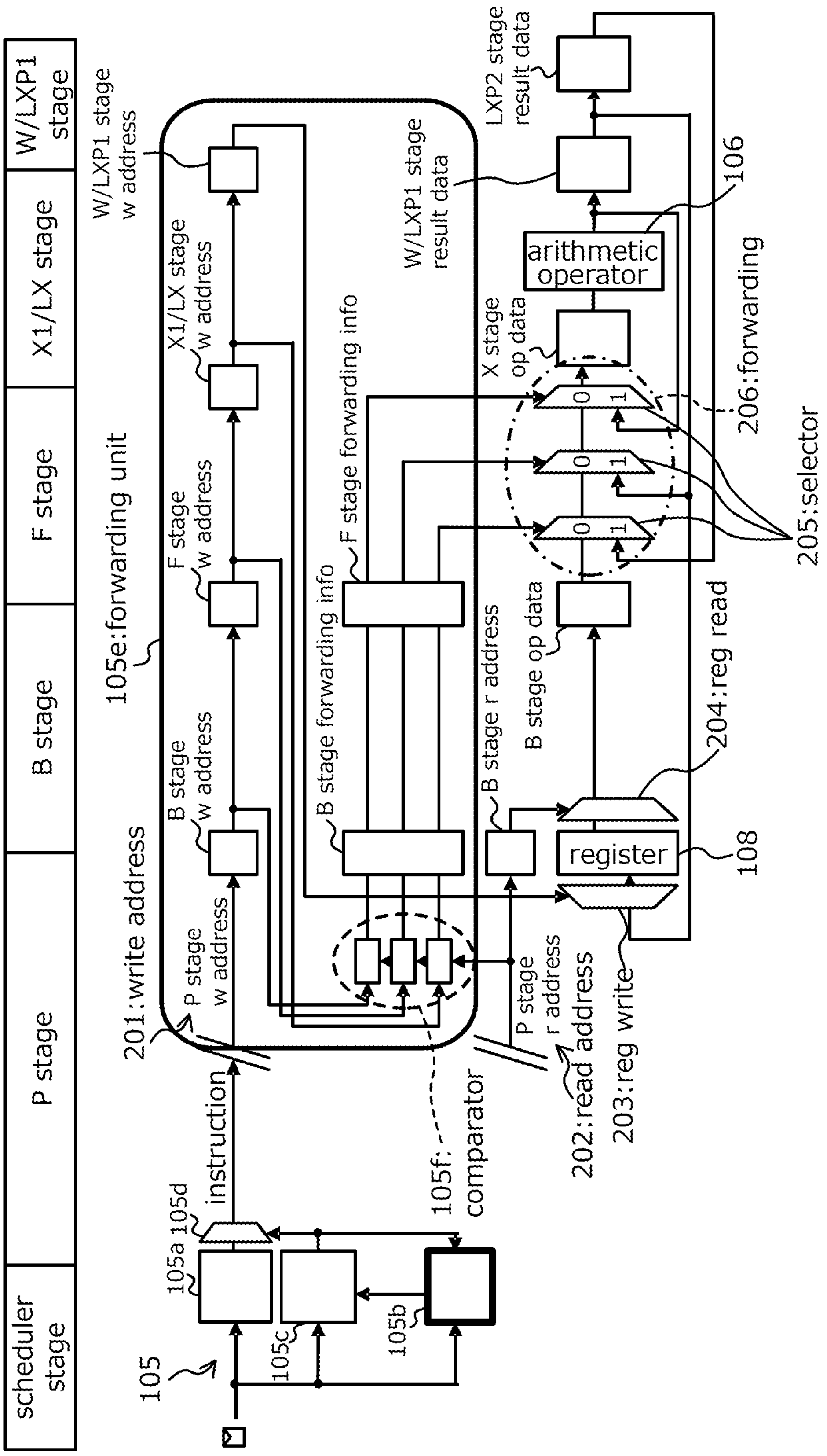
FIG. 4 is a diagram illustrating an example of a configuration of a core of a processor according to the comparative example.

FIG. 4 is a diagram illustrating an example of a configuration of the core of the processor 1 according to the comparative example. FIG. 4 illustrates an example of the configuration of the core, focusing on forwarding of a result of an arithmetic operation to an operand. FIG. 4 assumes, as an example, that the arithmetic latency is one cycle, and a single operand of the forwarding target exists. Hereinafter, a write address is represented by a w address, and a read address is represented by an r address in some cases.

FIG. 4 describes an example in which an instruction is issued from one issuing port of the selector 105*d* to one pipeline. Alternatively, an instruction may be issued from an issuing port provided for each of the arithmetic operators 106 to the respective corresponding pipelines of the arithmetic operators 106.

As illustrated in FIG. 4, a write address 201 of the preceding instruction issued from the selector 105*d* branches from the stages B, F, and X1, and is inputted into the comparators 105*f* corresponding to the respective stages. Further, a read address 202 (the address of the operand waiting for forwarding in the F stage) of the subsequent instruction having dependency with the preceding instruction is also inputted into the respective comparators 105*f*. As illustrated in FIG. 4, an area (circuitry) surrounded by a thick solid line including the comparators 105*f* may be referred to as a forwarding unit 105*e*.

If the write address 201 and the read address 202, which are exemplified by PRAs, match, the comparator 105*f* of each stage transmits forwarding information, for example, a signal for selecting the port 1, to the selector 205 of the corresponding stage. The selector 205, into which the forwarding information is inputted, selects data so as to input, from the X1/LX stage, the W/LXP1 stage, the LXP2 stage, or the like, the result of the arithmetic operation of the preceding instruction from the arithmetic operator 106 (e.g., ALU) to the operand of the F stage of the subsequent instruction. In this way, the forwarding 206 is accomplished by the switching control by the selector 205.

The result of the arithmetic operation of the preceding instruction is written into the write address 201 of the register 108 by reg write 203 in the W/LXP1 stages of the preceding instruction. If the forwarding 206 is not performed, the data is read by the reg read 204 from the read address 202 of the register 108 in the B stage of the subsequent instruction. The selector selects the port 0 and inputs data into the arithmetic operator 106.

In the target illustrated in FIG. 4, the number of the comparators **105*f* in the forwarding unit 105*e* increases in accordance with the number of operands to be forwarded, and may be, for example, an integral multiple (around one to four times, three times, for example) of the number of operands. In addition, when the number of pipelines increases x times, the number of the comparators 105*f* comes to be x^2 times because the number of the write addresses 201 that the comparators 105*f* compare with the read address 202 becomes x times and consequently the number of the read addresses 202** becomes x times.

Furthermore, the number of forwarding timings (the number of the selectors 205) comes to be the number obtained by subtracting an arithmetic latency from the latency from the reg read 204 to the reg write 203 (i.e., 4-1==3 in FIG. 4). Therefore, when the pipeline becomes deeper, for example, when the latency from the reg read 204 to the reg write 203 changes from four to seven, the forwarding timing is doubled and the number of the comparators **105*f*** is also doubled.

Also, if an inflight instruction width increases, the comparison width increases in the order of log 2, so that the circuit scale of each individual comparator **105*f*** also increases.

As described above, when improvement in IPC is intended due to enhancement performance of the core of processor 1, the circuit scale of the forwarding unit **105*e*** increases.

Figure 5:
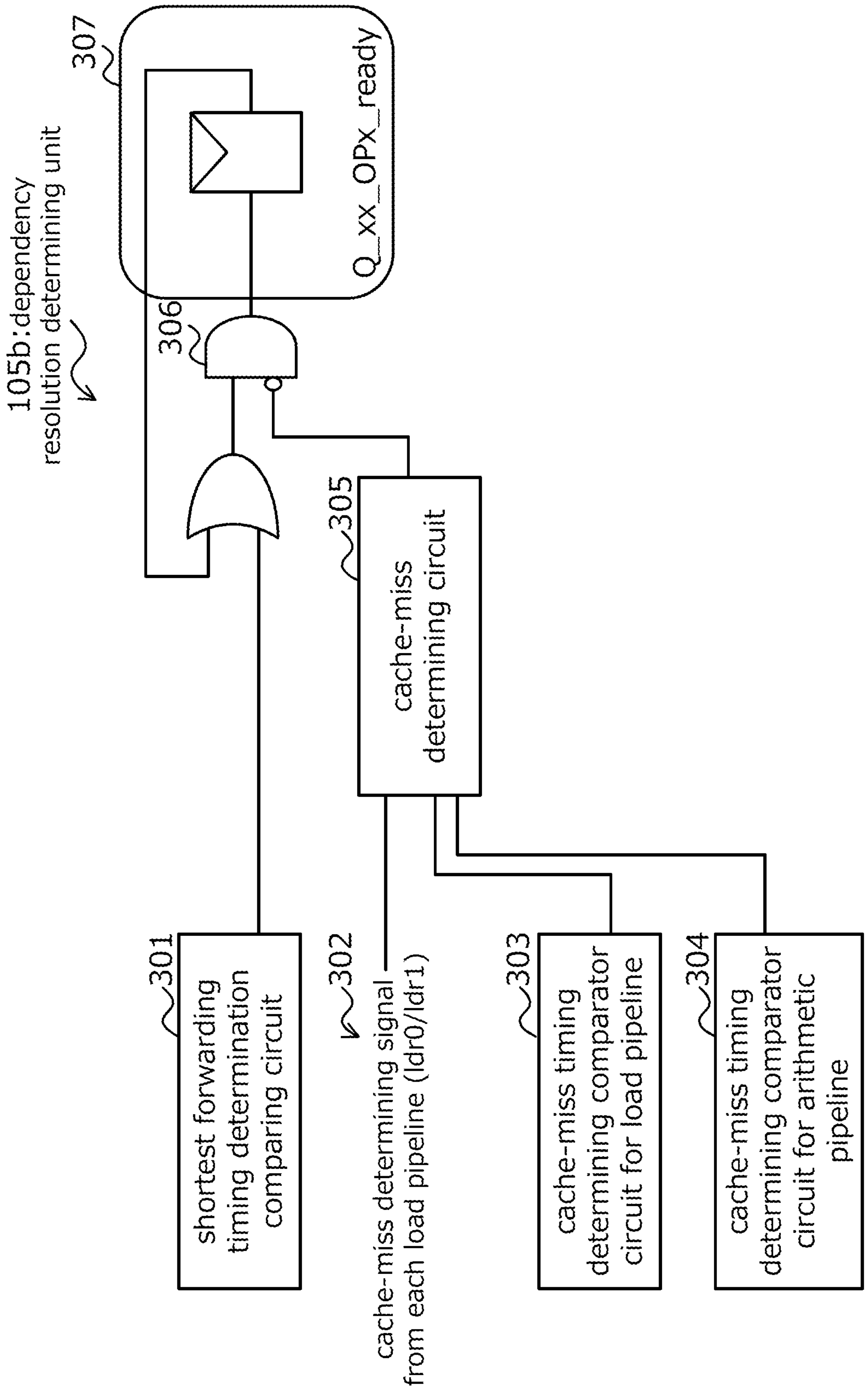
FIG. 5 is a block diagram illustrating an example of a configuration of a dependency resolution determining unit according to the comparative example.

FIG. 5 is a block diagram illustrating an example of a configuration of the dependency resolution determining unit **105*b* according to the comparative example. FIG. 5 illustrates an example of the configuration of the dependency resolution determining unit 105*b* that performs wakeup for one entry and one operand in the scheduler 105**.

As illustrated in FIG. 5, the dependency resolution determining unit **105*b* includes a shortest forwarding timing determination comparing circuit 301, a cache-miss timing determining comparator circuits 303 and 304, a cache-miss determining circuit 305, and an AND circuit 306**.

The shortest forwarding timing determination comparing circuit 301 is a comparing circuit that determines the shortest forwarding timing. The shortest forwarding timing determination comparing circuit 301 includes multiple comparators for individual pipelines, for example, in the number corresponding to the sum of the number of arithmetic pipelines **109*a* and the number of loading pipelines 109*b***.

Into the cache-miss determining circuit 305, a cache-miss determining signal 302 is inputted from each loading pipeline **109*b*. The cache-miss determining signal 302 may be, for example, signals LDR0 and LDR1 from the loading/storing queue 107 to the register 108 illustrated in FIG. 1**.

The scheduler 105 speculatively issues a cache-miss-dependent load (a load instruction (2) depending on a load instruction (1) that has resulted in a cache miss) prior to the occurrence of a cache miss. An example of the load instruction (1) is a load instruction "load r1<=[r0]", which writes data written in the r0 register, into the r1 register. An example of the load instruction (2) is a load instruction "load r2<=[r1]".

The cache-miss timing determining comparator circuit 303 is a comparing circuit for canceling a load speculatively issued. The cache-miss timing determining comparator circuit 304 is a comparing circuit for canceling an instruction (3) depending on the result of the arithmetic operation of an arithmetic instruction (2) that uses the result of the load instruction (1) which has been resulted in a cache miss and speculatively issued. The term "add" represents an example of an arithmetic operation. An example of the load instruction (1) is "load r1<=[r0]". An example of the arithmetic instruction (2) is an add instruction "add r2<=r1+r1" that adds the data of the r1 register to the data of the r1 register and writes the sum into the r2 register. An example of the instruction (3) is an add instruction "add r3<=r2+r2". Another example of the instruction (3) is a load instruction "load r3<=[r2]".

The cache-miss timing determining comparator circuit 303 is a circuit that determines a cache-miss timing of a load or an arithmetic instruction that has direct dependency with a load resulted in a cache miss, in the loading pipeline **109*b*, and includes the same number of comparators as the number of the loading pipelines 109*b***.

The cache-miss timing determining comparator circuit 304 is a circuit that determines a cache-miss timing of the above instruction (3) in the arithmetic pipeline **109*a*, and includes the same number of comparators as the number of the arithmetic pipelines 109*a***.

The cache-miss determining circuit 305 is a circuit that determines the presence or absence of a cache miss based on the cache-miss determining signal 302 and the outputs from the cache-miss timing determining comparator circuits 303 and 304.

The AND circuit 306 outputs, as a signal 307 of the dependency resolution notification, the result of AND on the output of the shortest forwarding timing determination comparing circuit 301 and the inversion of the output of the cache-miss determining circuit 305. The signal 307 is data dependency resolution bit (Q_xx_OPx_ready bit in the example of FIG. 5) of an OPx in an entry xx of the scheduler 105 (queue).

In the example of FIG. 5, the circuit scale of the dependency resolution determining unit **105*b* comes to be M times when the number of queues increases M times. In addition, the number of comparators of each of the blocks 301, 303, and 304 in the dependency resolution determining unit 105*b*** increases in accordance with the number of operands to be forwarded, and becomes, for example, an integral multiple (around one to four times, three times, for example) of the number of operands. Further, when the number of pipelines comes to be x times, the number of comparators also comes to be x times.

Also, when the number of the shortest forwarding timings increases from one to two, the number of comparators in the shortest forwarding timing determination comparing circuit 301 is doubled.

Furthermore, if an inflight instruction width increases, the comparison width (id width) increases in the order of log 2, so that the circuit scale of each individual comparator also increases.

As described above, when improvement in IPC is intended due to enhancement performance of the core of processor 1, the circuit scale of the dependency resolution determining unit **105*b*** increases.

(1-3) Example of Configuration of Processor Core According to One Embodiment Hereinafter, a core of the processor 1 according to one embodiment will now be described. In the following description of the one embodiment, configurations, processes, and functions that are not specifically described are the same as those in the comparative example.

Figure 6:
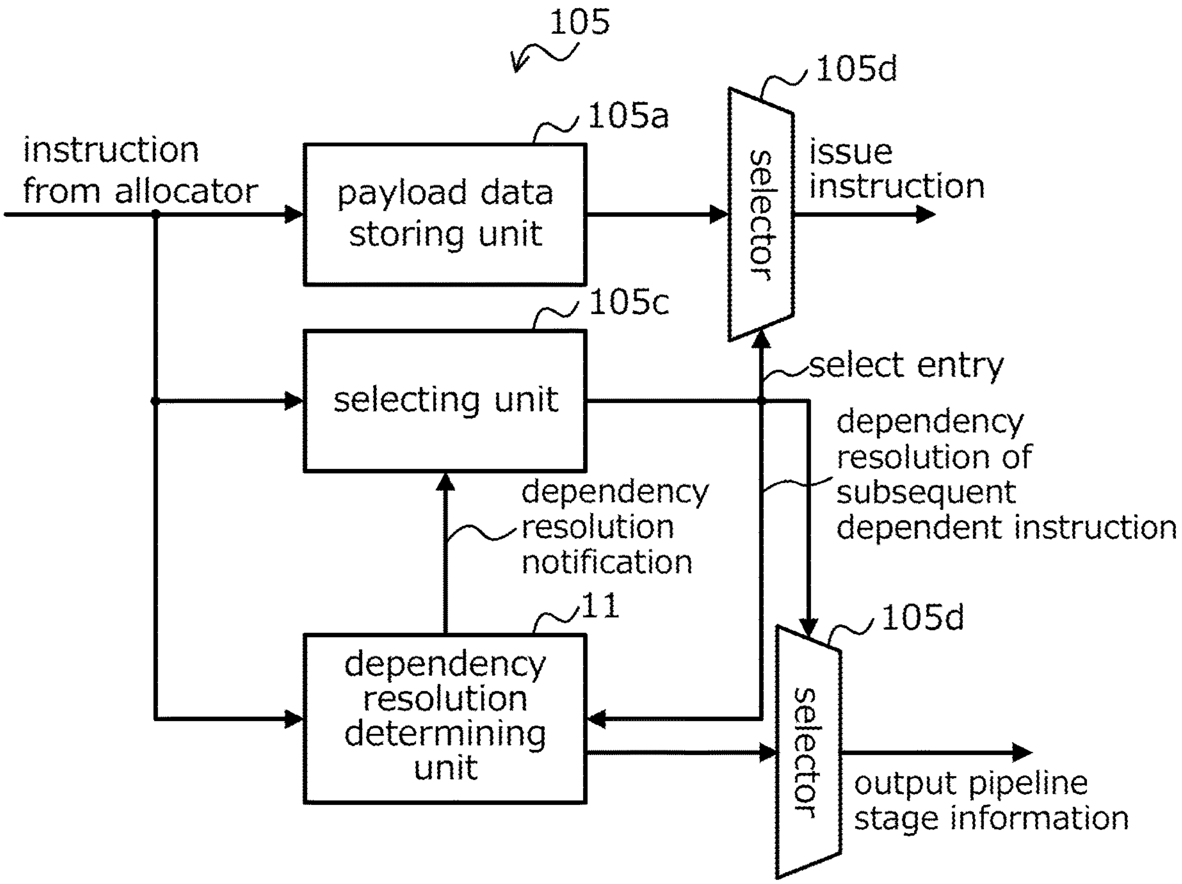
FIG. 6 is a block diagram illustrating an example of a configuration of a scheduler according to the one embodiment.

FIG. 6 is a block diagram illustrating an example of a configuration of the scheduler 105 according to the one embodiment. As illustrated in FIG. 6, comparing with the comparative example of FIG. 2, the scheduler 105 according to the one embodiment is different in the points of including a dependency resolution determining unit 11 in place of the dependency resolution determining unit 105*b* and also including a selector 105*d* that outputs pipeline stage information. The scheduler 105 is an example of control circuitry. The control circuitry holds an indicator indicating a pipeline that executes a producer instruction included in multiple instructions and an execution stage of the producer instruction in the pipeline, executes data dependency resolution between the producer instruction and a consumer instruction that uses an execution result of the producer instruction and that is included in the multiple instructions, and controls issuing timings of the multiple instructions.

The dependency resolution determining unit 11 outputs the dependency resolution notification to the selecting unit 105*c* and outputs the pipeline stage (hereinafter, sometimes referred to as "PS") information 207 to the selector 105*d* (the lower selector 105*d* in FIG. 6) selected by an entry selecting signal.

From the selecting unit 105*c*, the entry selecting signal is outputted. For example, the arrow inputted into the selector 105*d* from the selecting unit 105*c* is used to output information about an issued instruction including the PS information 207 from the scheduler 105 to the pipeline, and the arrow inputted into the dependency resolution determining unit 11 from the selecting unit 105*c* is used to resolve a subsequent dependent instruction. The upper selector 105*d* in FIG. 6 issues an instruction to the pipeline based on the entry selecting signal. The lower selector 105*d* in FIG. 6 selects the PS information 207 retained (in the dependency resolution determining unit 11) for each entry in the scheduler 105 with the entry selecting signal and outputs the PS information 207 of an entry for which an instruction is issued by the upper selector 105*d*.

On the basis of the PS information 207 and FIG. 5 (and FIG. 8 to be described below), the dependency resolution determining unit 11 controls the dependency resolution timing of the consumer instruction, which is an instruction having dependency with the producer instruction among the multiple instructions and which uses the execution result of the producer instruction. In one embodiment, attention is paid to FMA (Fused multiply-add) defined in terms of IEEE 754-2008, such as a product sum calculation of x*y+z that performs an addition on a product. For example, when the addition part of FMA is depended, the dependency resolution determining unit 11 sets "Q_xx_OPx_ready" based on the PS information 207 and performs wakeup, using "Q_xx_OPx_ready".

Figure 7:
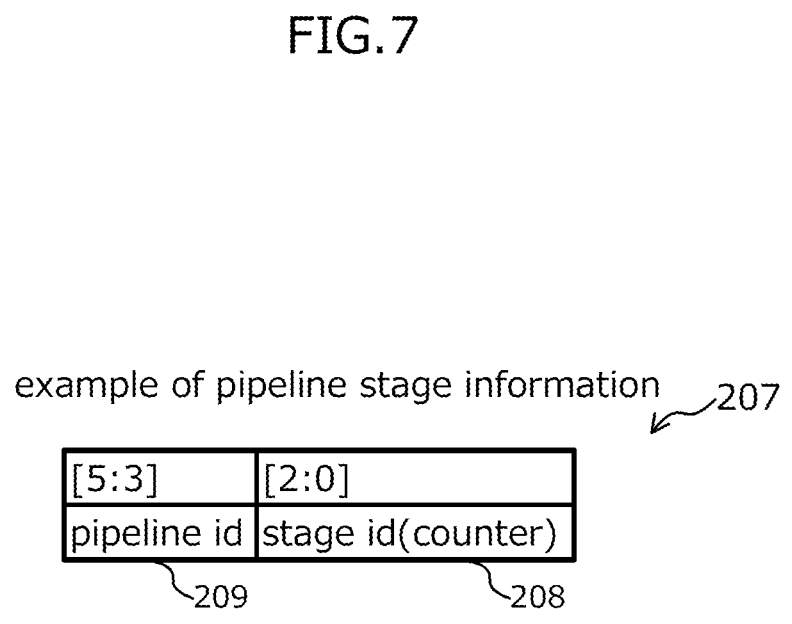

FIG. 7 is a diagram illustrating an example of the PS information 207. The PS information 207 is an example of an indicator indicating a pipeline that executes a producer instruction among the multiple instructions and an execution stage of the producer instruction in the pipeline.

For example, the PS information 207 may include pipeline information and stage information of a preceding instruction of each operand in the entry of the scheduler 105. In the example of FIG. 7, the PS information 207 includes a stage ID 208 for each operand and a pipeline ID 209, which is an example of the pipeline identification information of a pipeline to which the producer instruction has been issued.

In the illustration of FIG. 7, the PS information 207 may be six-bit information including a three-bit pipeline ID 209 of [5:3] and a three-bit stage ID 208 of [2:0]. The bit numbers of the stage ID 208 and the pipeline ID 209 are not limited to the above.

The stage ID 208 is, for example, a unique ID (stage_id) of each stage from the shortest forwarding timing to a stage before data passing through the register 108 when the forwarding is not required any longer. In other words, the stage ID 208 is an example of stage identification information uniquely allocated to each of stages from a first issuing timing (e.g., P of the instruction 2 in FIG. 13 to be described below) at which a result of an arithmetic operation can be transferred from the producer instruction to the consumer instruction at shortest to a second issuing timing (e.g. from the instruction 5 in FIG. 13 to the subsequent P) at which the result of the operation is stored in the register 108 and comes to be ready to be read by the consumer instruction.

The stage ID 208 may indicate the stage of the preceding instruction at the time when the subsequent instruction comes into the P stage (issued).

For example, the stage ID 208 may be expressed as a counter to which a value except for the initial value (e.g., 0) is set at LXMn corresponding to the shortest forwarding timing, and the initial value (e.g., 0) is set (0-cleared) at LXPn. In other words, the stage ID 208 is a counter that is set at a first cycle earlier by a first given number of cycles than the last cycle at which the producer instruction is executed, and is reset at a second cycle later by a second given number of cycles than the last cycle, and the counter value is uniquely allocated to each stage.

The first given number and the second given number may vary for different combinations of a pipeline and a forwarding type. A different stage ID 208 may also be allocated. The reason for the above two is that a forwarding timing depends on the length of the pipeline and the reading/writing timing of the register 108. A forwarding type is, for example, a fixed-point register, a floating-point register, or a CF (Condition Flag).

The pipeline ID 209 is an example of pipeline identification information of the pipeline through which the producer instruction is flowing, and a unique value may be set for each pipeline. The pipeline ID 209 is used to detect a timing at which the producer instruction is inputted into a pipeline and the pipeline into which the producer instruction is being inputted.

Figure 8:
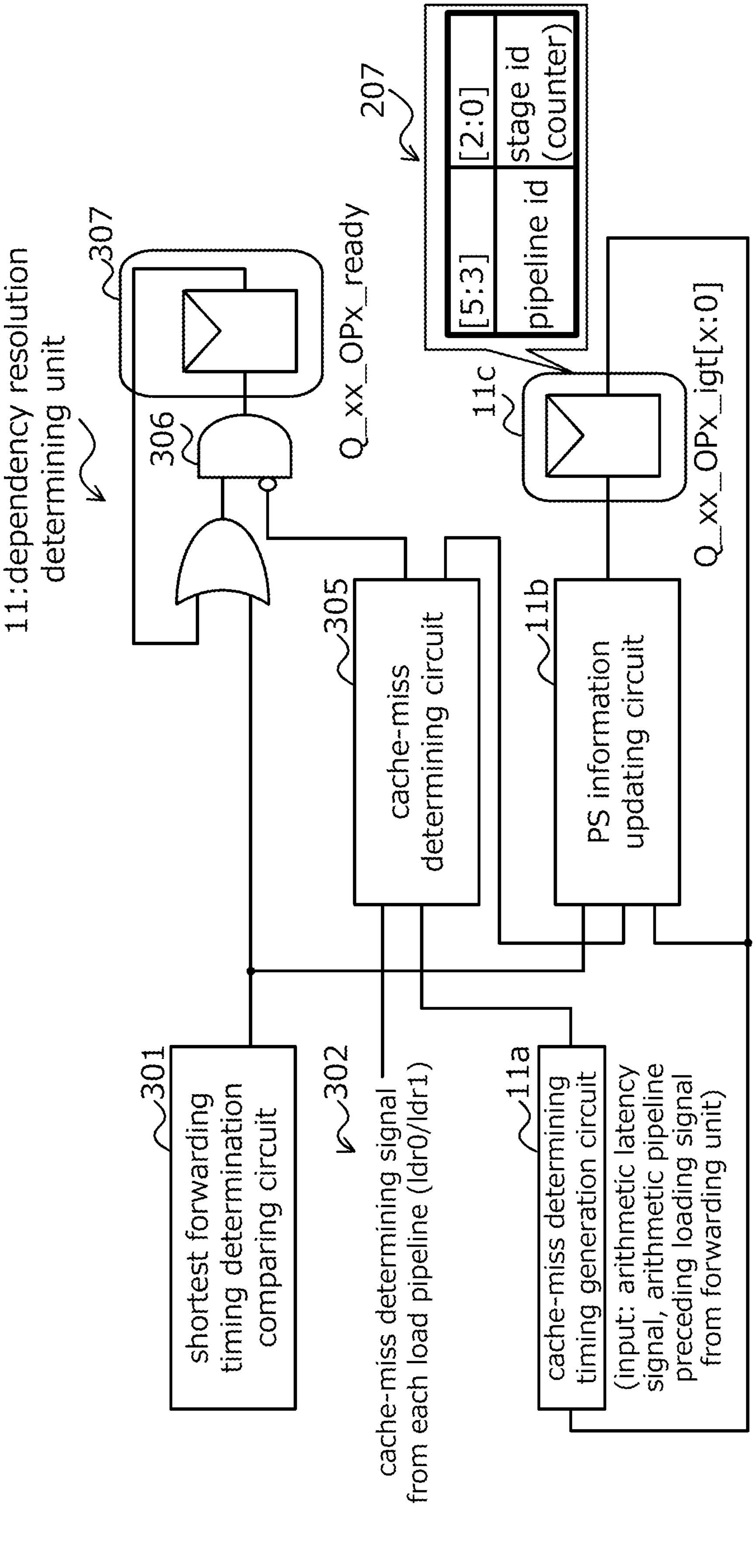
FIG. 8 is a block diagram illustrating an example of a configuration of a dependency resolution determining unit of the one embodiment.

FIG. 8 is a block diagram illustrating an example of a configuration of the dependency resolution determining unit 11 of the one embodiment. FIG. 8 illustrates an example of the configuration of the dependency resolution determining unit 11 that performs wakeup on one entry and also one operand in the scheduler 105.

As illustrated in FIG. 8, the dependency resolution determining unit 11 is different from that of the comparative example illustrated in FIG. 5 in that a cache-miss determining timing generation circuit 11*a* is provided in place of the cache-miss timing determining comparator circuits 303 and 304 and a PS information updating circuit 11*b* is newly provided.

The cache-miss determining timing generation circuit 11*a* generates an arithmetic latency signal and an arithmetic pipeline preceding load timing signal. Note that the arithmetic latency signal and the arithmetic pipeline preceding load timing signal may be inputted from the controlling unit 105*g* (see FIG. 16). Since the same PS information 207 is used for forwarding and cache-miss determination in practice, the forwarding unit 12 illustrated in FIG. 9 may be integrated with the controlling unit 105*g* illustrated in FIG. 16.

The arithmetic latency signal is a signal generated when the pipeline has latency spanning multiple cycles, and is generated for each pipeline. The arithmetic pipeline preceding load timing signal is a signal indicating a cache-miss determining timing of a load instruction that has direct or indirect (which means that another instruction interposed between the two instructions) dependency with an arithmetic instruction flowing through the arithmetic pipeline 109*a*. That is, the arithmetic pipeline preceding load timing signal is a signal indicating whether a preceding load instruction in a dependency chain has not reached a cache-miss determining timing yet and when the prospective cache-miss determining timing comes, whether the present time is the cache-miss determining timing, or whether the cache-miss determining timing has passed and a cache miss has been fixed (finally concluded). In a case where the load instruction has indirect dependency with an arithmetic instruction flowing through the arithmetic pipeline 109*a*, multiple arithmetic pipeline preceding load timing signal may arise for one operand.

The PS information updating circuit 11*b* outputs a signal 11*c* based on the shortest forwarding timing determination comparing circuit 301, the cache-miss determining circuit 305, and the PS information 207.

The signal 11*c* is a bit (in the example of FIG. 8, Q_xx_OPx_igt[x:0] bit) having information on a pipeline and a stage of a producer instruction (preceding instruction) of an operand x in an entry xx of the scheduler 105 (queue), and is an example of the updated PS information 207.

As the above, the PS information updating circuit 11*b* generates the PS information 207, which is related to a producer instruction, for each entry of a queue and also for each operand. In addition, the PS information updating circuit 11*b* performs data dependency resolution based on the PS information 207 held for each operand. Holding the PS information 207, the PS information updating circuit 11*b* may be referred to as a PS information holder. In the illustrated example, an operand is a register of a data source provided immediately before an arithmetic operator, and is exemplified by a register that holds the result of forwarding performed in the F cycle and that outputs the result in X1 cycle.

Figure 9:
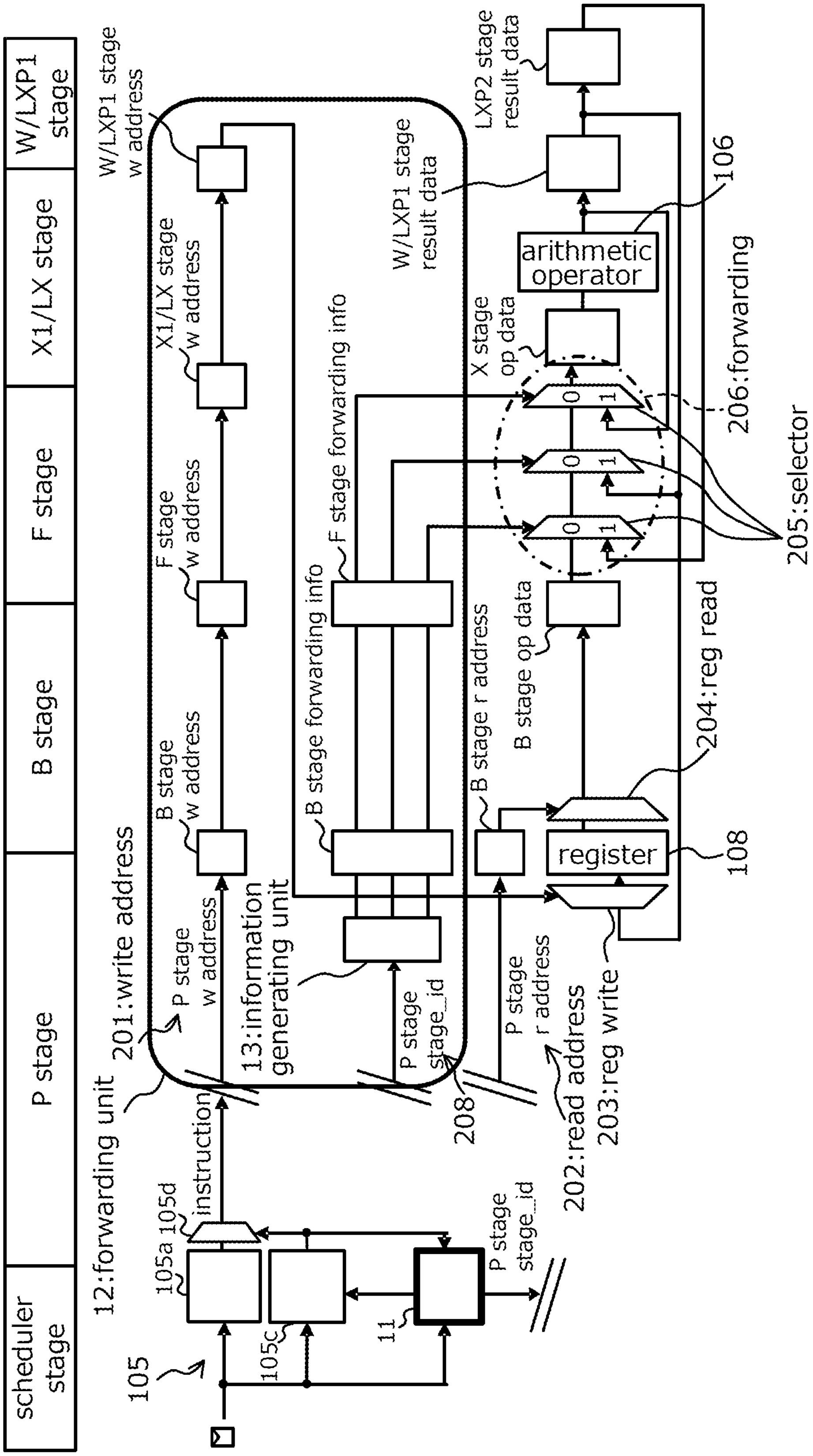
FIG. 9 is a diagram illustrating an example of a configuration of a core of a processor according to the one embodiment.

FIG. 9 is a diagram illustrating an example of the configuration of a part of the core of the processor 1 according to the one embodiment. As illustrated in FIG. 9, in the one embodiment, the processor 1 (scheduler 105) includes a forwarding unit 12 in place of the forwarding unit 105*e* according to the comparative example illustrated in FIG. 4.

The forwarding unit 12 includes an information generating unit 13 in place of the multiple comparators 105*f* according to the comparative example illustrated in FIG. 4.

Forwarding unit 12 is an example of forwarding control circuitry that forwards, based on the PS information 207, a result of an arithmetic operation of the producer instruction to an operand of the consumer instruction issued to a pipeline at a timing according to the control of the dependency resolution determining unit 11.

The information generating unit 13 generates forwarding information to be outputted to the selector 205 (forwarding 206) based on the stage ID 208 for each operand generated and held in the dependency resolution determining unit 11 of the scheduler 105.

The stage ID 208 is uniquely allocated to each of the (latency)-(arithmetic latency) forwarding timings from the reg read 204 to the reg write 203 (forwarding mux; three timings in the example of FIG. 9). Each of the multiple forwarding timings corresponds to the selector 205.

Here, the number of forwarding timings is three also when arithmetic latency is two cycles since the latency from the reg read 204 to the reg write 203 is five cycles and the arithmetic latency is two cycles like the case where the arithmetic latency is one cycle.

The number (stage_id width) of bits of the stage ID 208 is log_2{4}==2 from the calculation of the sum of the forwarding timing (three in the example FIG. 9) and the timing of reading data through a register (dependency undetected, e.g., one)==4.

In the pipeline illustrated in FIG. 9, the stage ID 208 is represented in two bits, and, for example, {1, 2, 3} is allocated to three forwarding timings. A forwarding timing {0} is allocated to the register read (read data through the register 108).

The information generating unit 13 decodes the stage ID 208 inputted from the dependency resolution determining unit 11. If the stage ID 208 is any one of 1, 2, and 3, which have been allocated to the forwarding timings, the information generating unit 13 generates the forwarding instruction signal of 1hot0. For example, the information generating unit 13 generates a forwarding instruction signal having a value "1" for a selector 205 associated with the stage ID 208, and generates a forwarding instruction signal having a value of "0" for all the remaining selectors 205. The selector 205 into which a forwarding instruction signal having a value "1" is inputted performs the forwarding 206 in the same manner as in the comparative example. A forwarding instruction signal is an example of forwarding information.

If the stage ID 208 is set to the value (0), which is allocated to the timing of reading data through the register 108, the information generating unit 13 generates a forwarding instruction signal having a value of "0" for all the selectors 205. In this case, the selector 205 selects the reg read 204 as in the comparative example.

Figure 10:
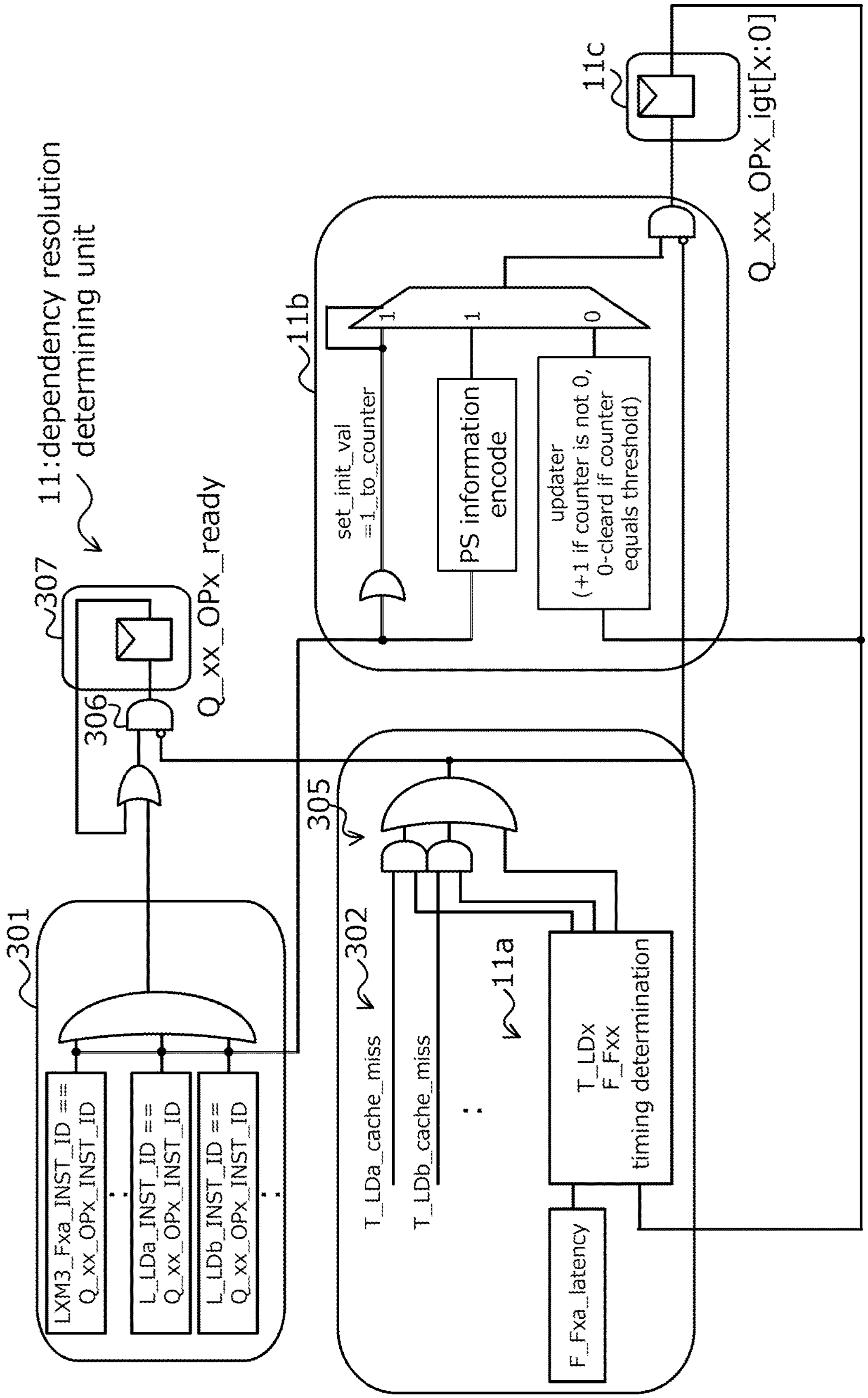
FIG. 10 is a block diagram illustrating an example of a circuit of the dependency resolution determining unit of FIG. 8.

FIG. 10 is a block diagram illustrating an example of a circuit of the dependency resolution determining unit 11 of FIG. 8. The dependency resolution determining unit 11 is provided for each entry and also for each operand. As illustrated in FIG. 10, the dependency resolution determining unit 11 includes a shortest forwarding timing determination comparing circuit 301 (see FIG. 10) that detects matching between an ID (Q_xx_OPx_INST_ID) indicating a preceding dependent instruction held for each entry and also for each operand and an ID of the preceding dependent instruction flowing through the arithmetic pipeline 109*a* and the loading pipeline 109*b*.

The shortest forwarding timing determination comparing circuit 301 is provided with comparators corresponding to the number of pipelines 109*a* and 109*b* through which a preceding instruction may flow. For example, the shortest forwarding timing determination comparing circuit 301 detects matching of one of the INST ID (LXM3_FXa_INST_ID) of the shortest forwarding timing LXM3 stage for the arithmetic pipeline 109*a* and the INST ID (L_LDX_INST_ID) of the shortest forwarding timing L stage for each loading pipeline 109*b* that have been notified from the forwarding unit 12 with the INST ID (Q_xx_OPx_INST_ID) indicating a preceding dependent instruction held for each entry and also for each operand. The INST_ID (instruction id) of the preceding dependent instruction is a unique ID to each instruction, and may be a PRA, for example. The shortest forwarding timing determination comparing circuit 301 then notifies the PS information updating circuit 11*b* of detected information as to which pipeline the directly dependent instruction has flowed through.

The PS information updating circuit 11*b* generates a pipeline ID 209 unique to the arithmetic pipeline 109*a* or the loading pipeline 109*b* by encoding the detected information as to which pipeline the directly dependent instruction has flowed through. The PS information updating circuit 11*b* fixedly sets the stage ID 208 to 1. In addition, the PS information updating circuit 11*b* refers to the stage ID 208 every cycle, increments the stage ID 208 if the stage ID 208 is a value except for "0", and sets the value "0" in the stage ID 208 if the stage ID 208 is a threshold. If the stage ID 208 is "0", the PS information updating circuit 11*b* does not increment (update) the stage ID 208.

When canceling a subsequent instruction in a dependency chain of a cache-miss load, the PS information updating circuit 11*b* may set "0" in the stage ID 208 (0-cleared). This is to avoid erroneously issuing a consumer instruction that depends on a load instruction in the control of issuing of a consumer instruction based on the stage ID 208.

The cache-miss determining timing generation circuit 11*a* identifies the cache-miss determining timing of an indirectly dependent preceding load instruction on the basis of the latency information of the directly dependent preceding arithmetic instruction and the PS information 207 having the dependency information from the arithmetic instruction. In addition, the cache-miss determining timing generation circuit 11*a* identifies the cache-miss determining timing of the directly dependent preceding load instruction on the basis of the PS information 207.

In FIG. 10, the symbol "F_" indicates the F stage when a stage of an arithmetic pipeline 109*a* illustrated in FIG. 3 is included. The symbol "T_" indicates a T stage when a stage of a loading pipeline 109*b* illustrated in FIG. 17 to be described below is included, and the symbol "L" indicates an L stage when a stage of a loading pipeline 109*b* illustrated in FIG. 17 to be described below is included.

Signals inputted from the cache-miss determining timing generation circuit 11*a* into the cache-miss determining circuit 305 are ones which sequentially mean the following from the top of FIG. 10.

- A signal indicating that the preceding load is the T timing in LDa.
- A signal indicating that the preceding load is the T timing in LDb.
- A signal indicating that the preceding load has passed the T timing and a cache miss in the load is fixed.

In this way, the cache-miss determining timing generation circuit 11*a* outputs a signal indicating whether the directly or indirectly dependent preceding loads are at the respective cache miss determining timings or have already passed the respective cache miss determining timings so that the cache miss is fixed.

Figure 11:
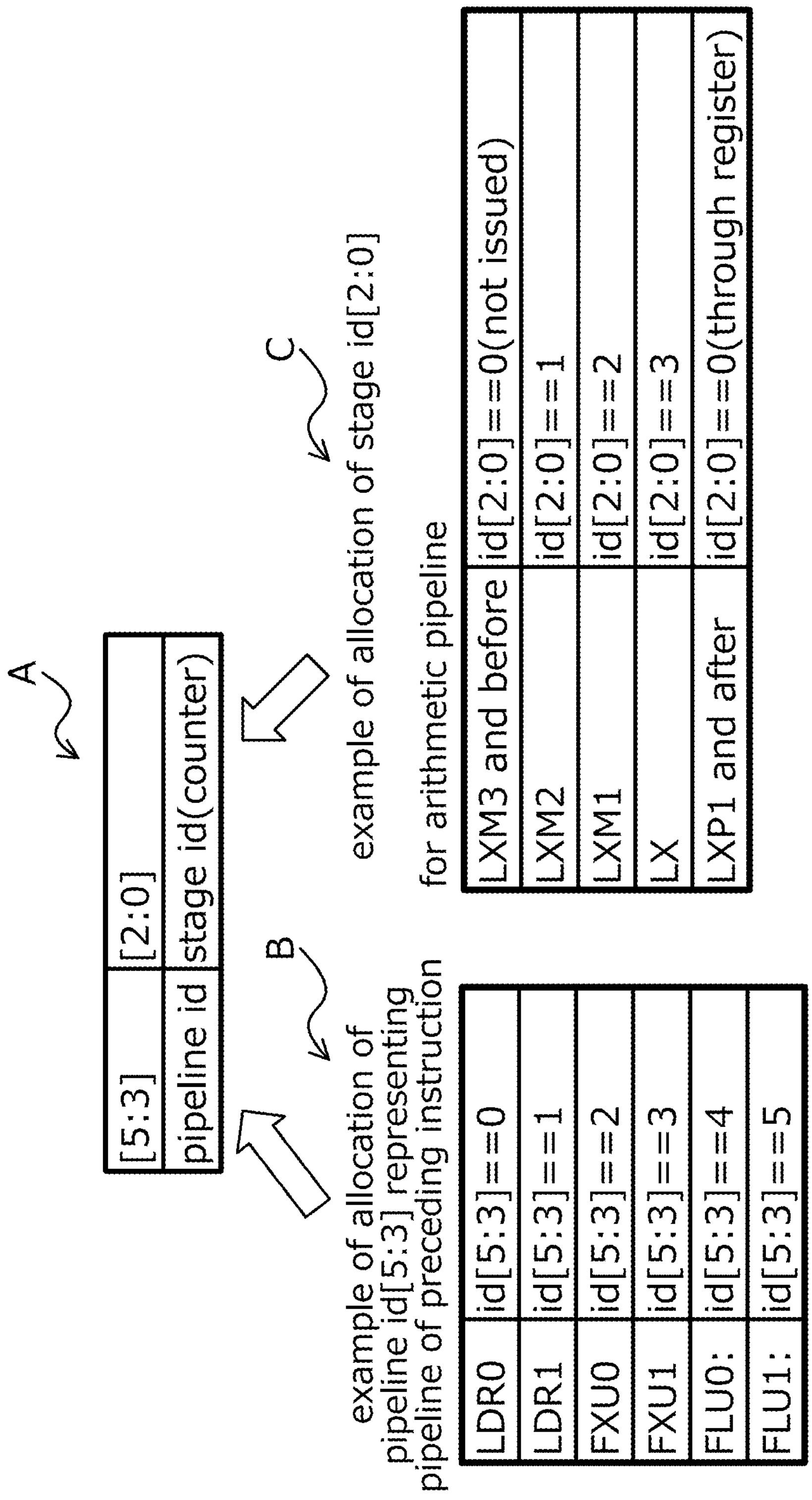
FIG. 11 is a diagram for explaining an example of allocation of pipeline stage information.

FIG. 11 is a diagram illustrating an example of allocation of the PS information 207. In FIG. 11, among the PS information 207 indicated by the reference symbol A, an example of allocating the pipeline ID 209 (id[5:3]) is indicated by the reference symbol B, and an example of allocating stage ID 208 (id[2:0](for the arithmetic pipeline 109*a*) is indicated by the reference symbol C.

As indicated by the reference symbol B, pipeline IDs 209 of {0, 1, 2, 3, 4, 5} are allocated to the pipelines of the LDR0, the LDR1, the FXU0 (FXU 106*e*), the FXU1 (FXU 106*f*), the FLU0 (FLU 106*g*), and the FLU1 (FLU 106*h*) illustrated in FIG. 1, respectively.

As indicated by the reference symbol C, the stage IDs 208 (for the arithmetic pipeline 109*a*) of {0, 1, 2, 3, 0} are allocated to the stages at the LXM3 and before, the stages at the LXM2, the LXM1, and the LX, and the stages at the LXP1 and after, respectively. The stage_id[2:0]==0 of the stages at the LXM3 and before indicates a state where the stage ID 208 has not been issued (dependency undetected), and the stage_id[2:0]==0 of the stages at the LXP1 and after indicates that data is read through the register 108.

For example, when the forwarding timing is not detected, the stage ID 208 is stage_id==0 (dependency undetected). When the shortest forwarding timing determination comparing circuit 301 detects the forwarding timing, the PS information updating circuit 11*b* sets stage_id=1 in the OR circuit and sets the pipeline ID 209 in the encoding unit (see "PS information encode" in FIG. 10).

In addition, in the updating unit (see "updater" in FIG. 10), the PS information updating circuit 11*b* detects the current stage_id!=0 for the stage id held by the PS information updating circuit 11*b* after one cycle, increments the value of stage_id held by the PS information updating circuit 11*b*, and sets the stage id=2. After two cycles, in the updating unit, the PS information updating circuit 11*b* detects the current stage_id!=0, increments the value of stage id, and sets the stage id=3. After three cycles, in the updating unit, the PS information updating circuit 11*b* detects the current stage_id==3(==threshold), increments the value of stage id, and sets the stage_id=0 (register read). After that, in the updating unit, the PS information updating circuit 11*b* detects the current stage_id==0 and suppresses the increment of the value of stage_id.

In the above-described embodiment, the stage ID 208 changes to . . . , 0, 1, 2, 3, 0, . . . (incremented), but the updating of the stage ID 208 is not limited to this. Alternatively, the stage ID 208 may be updated in various manners, such as, . . . 3, 2, 0, 1, 3, . . . or . . . 0, 1, 3, 2, 0, . . . .

In the comparative example illustrated in FIG. 5, the cache-miss timing determining comparator circuits 303 and 304 respectively include comparators corresponding to the numbers of the loading pipelines 109*b* and the arithmetic pipelines 109*a*. In the comparative example illustrated in FIG. 4, the forwarding unit 105*e* includes three comparators 105*f*.

On the other hand, as illustrated in FIG. 10, the dependency resolution determining unit 11 according to the one embodiment generates the PS information 207 including the stage ID 208 that can uniquely determine four timings including the forwarding timings of the respective comparators and the timing of reading data through register. In addition, the dependency resolution determining unit 11 can determine the cache-miss timing based on LDa, LDb, the PS information 207, and the like. Accordingly, the dependency resolution determining unit 11 can omit the comparators (i.e., the cache-miss timing determining comparator circuits 303 and 304) for the cache-miss timing determination.

Further, as illustrated in FIG. 9, the forwarding unit 12 includes the information generating unit 13 that generates the information indicating the forwarding timing based on the stage ID 208, so that the comparator 105*f* can be omitted.

As described above, according to the one embodiment, by reducing the comparison cost (for example, the mounting area) of the wakeup logic in the dependency resolution determining unit 11 of the scheduler 105, the circuit scale of the processor 1 that executes multiple instructions in parallel and sequentially from executable instructions can be reduced. As a result, the number of available entries of the scheduler 105 can be increased, and the performance of the processor 1 can be enhanced.

(1-4) Example of Determining Forwarding Timing

Next, an example of determining the forwarding timing according to an embodiment will be described in comparison with the comparative example.

FIG. 12 is a diagram illustrating an example of determining a forwarding timing of the comparative example, and FIG. 13 is a diagram illustrating an example of determining a forwarding timing of the one embodiment. The reference symbol A illustrates an example of the forwarding timing of an add instruction having latency of one cycle, and the reference symbol B illustrates an example of the functions of the respective stages.

In FIG. 12 and FIG. 13, an instruction 1 (No. 1) indicates a producer instruction, and instructions 2 to 5 (No. 2 to No. 5) indicate consumer instructions. The instructions 2 to 4 are instructions to execute forwarding (i.e., see arrows from the instruction 1 to the instructions 2 to 4), and the instruction 5 is an instruction to execute reference to the register 108.

As illustrated in FIG. 12, among the comparators **105*f* of the comparative example (see FIG. 4), the comparator 105*f* associated with the B stage compares the B stage of the instruction 1 with the P stage of the instruction 2 (see "↔", the same applies hereinafter). When the stages match, the comparator 105*f*** outputs forwarding information for forwarding data (see dashed line) from the LX stage of the instruction 1 to the OP1 of the F stage of the instruction 2.

The comparator **105*f*** associated with the F stage compares the F stage of the instruction 1 with the P stage of the instruction 3, and, if the stages match, outputs forwarding information for forwarding data (see the one-dot dashed line) from the P1 stage of the instruction 1 to the OP1 of the F stage of the instruction 3.

The comparator **105*f*** associated with the X1 stage compares the X1 stage of the instruction 1 with the P stage of the instruction 4, and, if the stages match, outputs forwarding information for forwarding data (see the dotted line) from the P2 stage of the instruction 1 to the OP1 of the F stage of the instruction 4.

In executing the instruction 5, the result of the arithmetic operation of the instruction 1 is written into the register 108 in the B stage (fifth cycle). Therefore, the processor 1 can read the data from the register 108 in the B stage (sixth cycle) of the instruction 5.

As the above, the comparator **105*f* of the forwarding unit 105*e*** compares {B,F,X1}_[preceding instruction pipeline] with P_[dependent instruction pipeline].

In the above-described determination of the forwarding timing according to the comparative embodiment, the forwarding unit **105*e* includes three comparators 105*f*. With this configuration, as the number of pipelines of a preceding instruction, the number of pipelines of a dependent instruction, and the like increase, the depth of the pipeline increases, so that the number of the comparators 105*f* increases. For example, the number of the comparators 105*f* can be calculated by multiplying the depth of the pipelines, the number of pipelines capable of forwarding, the number of pipelines, and the number of operands. Since an increase in the number of the comparators 105*f* accompanies an increase in the amount of the scheduler 105, delays occur without exerting the function of the processor 1 so that the entry of the scheduler 105** is restricted.

In the embodiment of FIG. 13, the dependency resolution determining unit 11 compares LXM3 of the instruction 1 in the entry of the scheduler 105 with the instructions 2 to 5.

The stage ID 208 indicates the stages of the instruction 1, which is the producer instruction. If the instruction 2 has a stage_id==1, the stage ID 208 indicates that the producer instruction 1 is in an LXM2 stage. Since the PS information 207 is selected from the scheduler 105 in the P stage, the meaning is the same as in the inside of scheduler 105 even if the instruction 2 is in the P stage. When the arithmetic latency of the instruction 1 is one, the LXM2 stage becomes the B stage. The same applies to the description of FIG. 13. When detecting the stage_id==1 of the instruction 2, the information generating unit 13 outputs forwarding information for forwarding data (see dashed line) from the LX stage of the instruction 1 to the OP1 of the F stage of the instruction 2.

If the instruction 3 has a stage_id==2, the stage ID 208 indicates that producer instruction 1 is in an LXM1 stage. When detecting the stage_id==2 of the instruction 3, the information generating unit 13 outputs the forwarding information for forwarding data (see the one-dot dashed line) from the LXP1 (LastX plus 1) stage of the instruction 1 to the OP1 of the F stage of the instruction 3.

If the instruction has a stage_id==3, the stage ID 208 indicates that the producer instruction 1 is in an LX stage. When detecting the stage_id==3 of the instruction 4, the information generating unit 13 outputs the forwarding information for forwarding data (see the dotted line) from the LXP2 (LastX plus 2) stage of the instruction 1 to the OP1 of the F stage of the instruction 4.

Since the instruction 5 has a stage_id==0, the information generating unit 13 does not generate forwarding information. In this case, the processor 1 can read data from the register 108 in the B stage of the instruction 5 (sixth cycle).

As described above, the forwarding unit 12 according to the one embodiment can determine the forwarding timing by using the stage ID 208 in a configuration omitting the comparators **105*f***.

In the one embodiment, the timing at which the consumer instruction receives data from the producer instruction is assumed to be the F stage of the consumer instruction, but the timing is not limited to this. Alternatively, the receiving timing may be a stage earlier than the F stage of the consumer instruction.

The above description assumes that the number of the shortest forwarding timings is one, but two or more shortest forward timings may exist.

For example, IEEE754-2008 defines an FMA (Fused multiply-add) that performs a product sum calculation of x*y+z. Since the addition part of the FMA (fma) performs the addition on the products, so that the arithmetic latency is low. That is, in FMA, the latency is determined not only by the arithmetic latency of the preceding instruction, but also by the operand type of FMA.

The examples of FIG. 12 and FIG. 13 assume that the subsequent instruction uses data forwarded from the X1 stage of the preceding instruction to the OP1. The following description assumes that FMA takes a total of four cycles of two cycles in the arithmetic operation of the "multiplication" and two cycles in the arithmetic operation of the "addition".

The multiplication part "xy" of the subsequent instruction uses the data from the X1 stage of the preceding instruction and the addition part "z" of the subsequent instruction uses data from the X3 stage of the preceding instruction. In this case, the timing of wakeup is the LXM3 in the multiplication part "xy", but is the LXM5 in the addition part "z". This means that the scheduler 105 will compare the two shortest forward timings of the LXM3 and the LXM5.

FIG. 14 is a diagram illustrating an example of determining in a case where two shortest forwarding timings are present in the comparative example, and FIG. 15 is a diagram illustrating an example of determining in a case where two shortest forwarding timings are present in the one embodiment. The reference symbol A illustrates an example of the forwarding timing of an fma instruction having latency of two cycles, the reference symbol B illustrates an example of the functions of the respective stages, and the reference symbol C represents an example of the function of the fma.

In FIG. 14 and FIG. 15, each of the instruction 1 (No. 1) and the instruction 2 (No. 2) indicates a producer instruction, and the instruction 3 (No. 3; FIG. 14) or the instructions 3 to 7 (No. 3 to 7; FIG. 15) indicate a consumer instruction in which forwarding (see arrows from the instruction 1 or 2 to the instructions 3 to 7) is executed. The instruction 8 illustrated in FIG. 15 is a consumer instruction that refers to the register 108.

In addition, in FIG. 14 and FIG. 15, the forwarding timing to an operand of the addition part of the instruction 3 from the instruction 2 may be executed any time as long as the forwarding timing makes it to the execution of the addition operation, and is allowed not to be executed during the multiplication operation. For example, in forwarding from the instruction 1 to the instruction 3, data is forwarded from the LX stage of the instruction 1 to the OP1 and the OP2 of the F stage of the instruction 3.

Illustration and description of the forwarding to the OP2 is omitted. In forwarding from the instruction 2 to the instruction 3, data is forwarded from the LX stage of the instruction 2 to the OP3 of the X2 stage of the instruction 3. This can conceal two cycles which are latency of multiply (multiplication operation).

In the comparative example, as illustrated in FIG. 14, the LXM3 of the instruction 1 and the instruction 3 (OP1) in the entry of the scheduler 105 are compared in the fourth cycle (three cycles earlier than the LX of the instruction 1). In order to most rapidly issue an instruction in accumulate (see X3, X4 of the reference symbol C), the scheduler 105 compares the LXM5 of the instruction 2 and the instruction 3 (OP3) in the fourth cycle, and detects the dependency between the instructions to resolve the dependency.

This increases the cost for detecting dependency in the dependency resolution determining unit 105*b*, which is exemplified by a cost (e.g., mounting area) for comparing the IDs and the register numbers unique to the instructions. The number of comparators 105*f* in the pipeline also increases as compared to the example illustrated in FIG. 12.

On the other hand, in the example of FIG. 15, the PS information updating circuit 11*b* of the dependency resolution determining unit 11 generates PS information 207 corresponding to the pipeline of the instruction 2 based on comparison in the LXM5 in addition to generation of the PS information 207 corresponding to the pipeline of the instruction 1 based on the comparison in the above-described LXM3. For example, the PS information updating circuit 11*b* updates the stage ID 208 of the respective PS information 207 at respective timings of LXM3 and LXM5 for the respective pipeline IDs 209 specified by the output from shortest forwarding timing determination comparing circuit 301.

Furthermore, in the example of FIG. 15, the stage ID 208 (PS information 207) corresponding to the OP1 of the subsequent instruction 3 indicates the stage_id of the pipeline of the preceding instruction 1, and the stage ID 208 corresponding to the OP3 of the subsequent instruction 3 indicates the stage_id in the pipeline of the preceding instruction 2.

(Forwarding from Instruction 1)

When detecting the stage_id==1 corresponding to the OP1 in the P cycle of the instruction 3, the information generating unit 13 outputs the forwarding information for forwarding data from the LX stage of the instruction 1 to the OP1 of the F stage of the instruction 3.

When detecting the stage_id==2 corresponding to the OP1 in the P cycle of the instruction 4, the information generating unit 13 outputs the forwarding information for forwarding data from the LXP1 stage of the instruction 1 to the OP1 of the F stage of the instruction 4.

When detecting the stage_id==3 corresponding to the OP1 in the P cycle of the instruction 5, the information generating unit 13 outputs the forwarding information for forwarding data from the LXP2 stage of the instruction 1 to the OP1 of the F stage of the instruction 5.

With respect to the instruction 6 and the subsequent instructions each of which has stage_id==0 corresponding to the OP1, the information generating unit 13 does not generate the forwarding information for the OP1. In this case, the processor 1 reads data from the register 108 in the B stage (sixth cycle) at and later than the instruction 6.

(Forwarding from Instruction 2)

When detecting the stage_id==1 corresponding to the OP3 in the P cycle of the instruction 3, the information generating unit 13 outputs the forwarding information for forwarding data from the LX stage of the instruction 2 to the OP3 of the X2 stage of the instruction 3.

When detecting the stage_id==2 corresponding to the OP3 in the P cycle of the instruction 4, the information generating unit 13 outputs the forwarding information for forwarding data from the LXP1 stage of the instruction 2 to the OP3 of the X2 stage of the instruction 4.

When detecting the stage_id==3 corresponding to the OP3 in the P cycle of the instruction 5, the information generating unit 13 outputs the forwarding information for forwarding data from the LX stage of the instruction 2 to the OP3 of the F stage of the instruction 5.

When detecting the stage_id==4 corresponding to the OP3 in the P cycle of the instruction 6, the information generating unit 13 outputs the forwarding information for forwarding data from the LXP1 stage of the instruction 2 to the OP3 of the F stage of the instruction 6.

When detecting the stage_id==5 corresponding to the OP3 in the P cycle of the instruction 7, the information generating unit 13 outputs the forwarding information for forwarding data from the LXP2 stage of the instruction 2 to the OP3 of the F stage of the instruction 7.

With respect to the instruction 8 and subsequent instructions each of which has stage_id==0 corresponding to the OP3, the information generating unit 13 does not generate the forwarding information for the OP3. In this case, the processor 1 reads data from the register 108 in the B stage (eleventh cycle) at and later than the instruction 8.

With the above configuration, even in a process, such as an FMA, in which multiple shortest forwarding timings are present, the comparator 105*f* in the pipeline is dispensable.

If an instruction does not have Accumulate forwarding (forwarding to the X2 instead of the F, see the OP3 in the instructions 3 and 4), and if op3 stage id==2, for example, the dependency resolution determining unit 11 may raise a wakeup ready bit for the control such that the instruction is issued at or after stage_id==3 in the P stage.

(1-5) Example of Configuration to Cancel a Subsequent Instruction in a Dependency Chain of a Cache-Miss Load Although description has been made in relation to the configuration for determining a forwarding timing, the method using the PS information 207 according to the one embodiment is also applicable to canceling a subsequent instruction in a dependency chain of a cache-miss load.

Figure 16:
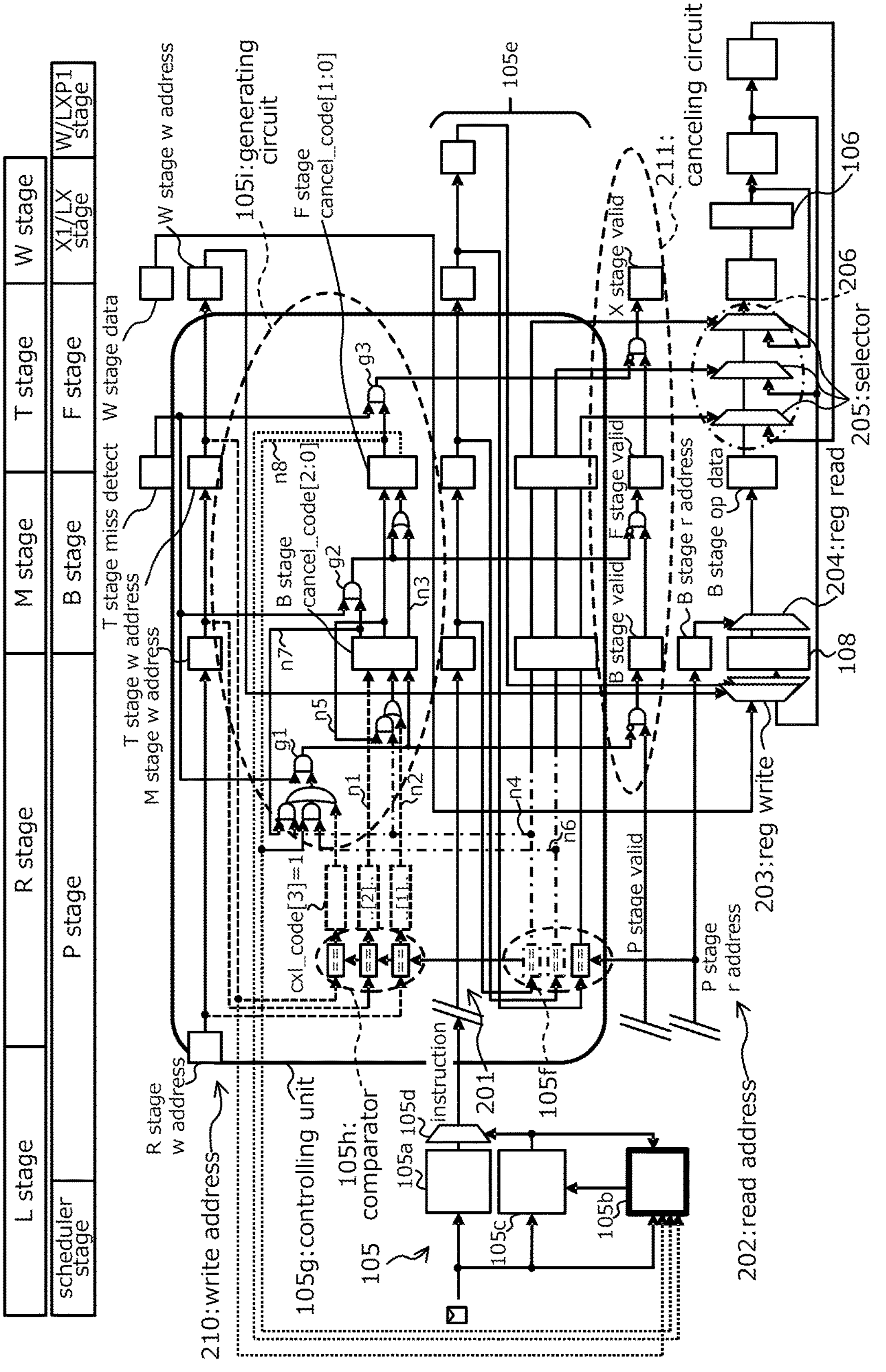
FIG. 16 is a diagram illustrating an example of a configuration focusing on a canceling process of a subsequent instruction in a dependency chain of a cache-miss load in a configuration of the core of the processor according to the comparative example.

FIG. 16 is a diagram illustrating an example of a configuration focusing on a canceling process (hereinafter, sometimes referred to as a "cache-miss canceling") on a subsequent instruction in a dependency chain of a cache-miss load in a configuration of the core of the processor 1 according to the comparative example. FIG. 16 assumes a case where the arithmetic latency is one cycle and the target operand is one.

The term "canceling" may mean that an instruction that has been issued from the scheduler 105 is deleted from the pipeline and also the instruction remaining in the scheduler 105 is made in a state of not being issued.

In FIG. 16, the dashed line represents a process of canceling an arithmetic dependent instruction from a cache-miss load; the one-dot dashed line represents a process of canceling an arithmetic dependent instruction from a load-dependent arithmetic operation; and the dotted line represents a process of canceling in an entry of the corresponding scheduler 105.

As illustrated in FIG. 16, the core (e.g., scheduler 105) of the processor 1 may include a controlling unit 105*g*. The controlling unit 105*g* may include a forwarding unit 105*e* including comparators 105*f*, multiple comparators 105*h*, and a generating circuit 105*i* that generates a cache-miss signal based on an arithmetic pipeline preceding load timing signal (sometimes represented by a "cancel_code" in FIG. 16 and subsequent figures). The core of the processor 1 may also include a canceling circuit 211 that cancels the forwarding 206 of the consumer instruction on the basis of a cache miss signal and a valid signal.

FIG. 17 is a diagram illustrating an example of determining cache-miss canceling according to the comparative example. The reference symbol A in FIG. 17 indicates an example of the timing of the cache-miss canceling of an add instruction having latency of one cycle, and the reference symbol B represents an example of the function of each stage.

As indicated by the reference symbol B in FIG. 17, the L stage indicates a stage in which a load instruction depending on a cache miss is issued to a pipeline. The R stage indicates a stage in which data is read from the RAM. The M stage indicates a stage in which tag matching and selection are performed. The T stage indicates a stage in which data arrives or a mistake occurs. A cache miss is found in the T stage. The W stage indicates a stage in which data is written into the register 108.

Hereinafter, description will now be made in relation to an example of a process of canceling a consumer instruction in the event of a cache miss according to the comparative example with reference to FIGS. 16 and 17.

As illustrated in FIG. 17, the instructions 2 to 5 have a direct dependency with the instruction 1. Therefore, the scheduler 105 compares the T stage of the instruction 1 with each of the instructions 2 to 5, and when a cache miss is determined in the T stage, cancels the issuing of the instructions 2 to 5. At and after the issuing timings of the instructions 5 and 8, no instruction is issued from the scheduler 105.

The instructions 2 to 5 each hold both the issuing timing information from the instruction 1 to the own instruction and an arithmetic pipeline preceding load timing signal which is information indicating that a cache miss in the instruction 1 is fixed, and identify the T stage (cycle) of the instruction 1.

The arithmetic pipeline preceding load timing signal is a code generated by the controlling unit 105*g* illustrated in FIG. 16, for example, the comparator 105*h*. The arithmetic pipeline preceding load timing signal is a signal for notifying the cache-miss determining timing (T stage of the instruction 1) of the dependent preceding load (instruction 1) to an instruction speculatively issued from the scheduler (P stage) or an instruction that is not issued from the scheduler but depends on an arithmetic operation connected from the load, and for canceling the above instruction. The arithmetic pipeline preceding load timing signal of the F stage of the arithmetic pipeline 109*a* matches the arithmetic pipeline preceding load timing signal to be notified to the cache-miss timing determining comparator circuit 304 for an arithmetic pipeline of FIG. 5 and/or to the cache-miss determining timing generation circuit 11*a* of FIG. 8.

For example, an arithmetic pipeline preceding load timing signal may indicate one of the following:

- A cache-miss determining timing of the loading pipeline 109*b* of a directly or indirectly dependent preceding load instruction comes N cycle later.
- A comparison timing of the arithmetic pipeline 109*a* matches the cache-miss timing of the loading pipeline 109*b* (refers to a cache-miss determining signal).
- The cache-miss timing has already expired (the cache miss has been fixed by referring to a cache-miss determining signal before).

For example, at the issuing timing of the instruction 2, the controlling unit 105*g* compares the R stage (write address 210) of the instruction 1 of the second cycle with the P stage (read address 202) of the instruction 2. At the issuing timing of the instruction 3, the controlling unit 105*g* compares the M stage of the instruction 1 of the third cycle with the P stage of the instruction 3. At the issuing timing of the instruction 4, the controlling unit 105*g* compares the T stage of the instruction 1 of the fourth cycle with the P stage of the instruction 4. At the issuing timings of instruction 5 and the subsequent instructions, the controlling unit 105*g* identifies the cache-miss determining timing (T stage) of the dependent preceding load, using a comparator 303 in the scheduler, and carries out cache-miss canceling, using the cache-miss determining signal. For the above, at the issuing timings of instruction 5 and the subsequent instructions, no directly dependent instruction from the load is issued from the scheduler.

The controlling unit 105*g* sets a bit "1" in the cancel_code [1] according to the comparison result between the R stage and the P stage by the comparator 105*h*. In addition, the controlling unit 105*g* sets a bit "1" in the cancel_code[2] according to the comparison result between the M stage and the P stage by the comparator 105*h*. Furthermore, the controlling unit 105*g* sets a bit "1" in the cancel_code[3] according to the comparison result between the T stage and the P stage by the comparator 105*h*.

Here, the instructions 6 to 8 each have no direct dependency with the instruction 1, and each depend on the instruction 2 depending on the instruction 1. For the above, the controlling unit 105*g* cancels each of the instructions 6 to 8 on the basis of the comparison of the instruction 2 with each of the instructions 6 to 8 and the arithmetic pipeline preceding load timing signal of the instruction 2.

For example, for an instruction (instructions 6 and 7) that is not directly dependent on the dependent preceding load (instruction 1), the cache-miss determining timing (T stage of the instruction 1) of the preceding dependent preceding load (instruction 1) is identified by taking over an arithmetic pipeline preceding load timing signal from the instruction (instruction 2) that is directly dependent on the instruction (indicated by multiple paths that loopback from B stage cancel code [2:0] or F stage cancel code [1:0] to B stage cancel_code [2:0] in FIG. 16), and the cache-miss canceling is performed according to a cache-miss determining signal.

In relation to the instruction 8 and subsequent instructions to the instruction 8, the cache-miss determining timing (T stage) of the preceding load (instruction 1) is identified by ID matching of the F stage of the arithmetic pipeline 109*a*, the arithmetic pipeline preceding load timing signal of the F stage of the arithmetic pipeline 109*a*, and the latency (=1) of the preceding arithmetic instruction (instruction 2) in the cache-miss timing determining comparator circuit 304 of the scheduler 105, and the cache-miss canceling is performed on the instruction 8 by the cache-miss determining signal of the instruction 1. Accordingly, the instructions are not issued from the scheduler 105.

The arithmetic pipeline preceding load timing signal includes relative position information between a producer instruction load (instruction 1) and an instruction (instruction 2). Thus, each of the instructions 6 to 8 can identify the T stage of the depended load instruction 1 with reference to the following two pieces of information.

Relative position between each of the instructions 6 to 8 and the instruction 2 obtained by comparing each of the instructions 6 to 8 with the instruction 2.

Relative position between the instruction 2 and the instruction 1 based on the arithmetic pipeline preceding load timing signal.

For the instructions 6 to 8, the controlling unit 105*g* obtains the arithmetic pipeline preceding load timing signal of the F stage of the instruction 2 on which the instructions 6 to 8 directly depend, and cancels each of the instructions 6 to 8 on the basis of the comparison between the F stage of the instruction 2 and each of the instructions 6 to 8 and the cache-miss determining signal of the instruction 1.

For example, the issuing timing of the instruction 6 is the B stage of the instruction 2 of the third cycle==the P stage of the instruction 6 (see n4 in FIG. 16). The B_cancel_code [1](see n5) of the instruction 2 indicates the B stage of the instruction 2=the M stage of the instruction 1. Since the M stage of the instruction 1=the P stage of the instruction 6, the controlling unit 105*g* sets B_cancel_code[2] of the instruction 6.

The issuing timing of the instruction 7 is the F stage of the instruction 2 of the fourth cycle==the P stage of the instruction 7 (see n6), or the B stage of the instruction 3==the P stage of the instruction 7 (if dependency exists) (see n4). The F cancel code[1] of the instruction 2 (see n8) indicates the F stage of the instruction 2==the T stage of instruction 1. Since the T stage of the instruction 1==the P stage of the instruction 7, the controlling unit 105*g* cancels the instruction 7 with the cache-miss signal (see g1). The B_cancel_code[2](see n7) of the instruction 3 indicates the B stage of the instruction 3==the T stage of the instruction 1. Since the T stage of the instruction 1==the P stage of the instruction 7, the controlling unit 105*g* cancels the instruction 7 with the cache-miss signal (see g1).

For example, the controlling unit 105*g* issues, to the canceling circuit 211, a cache-miss signal, which is an AND between a T stage miss detect signal and an arithmetic pipeline preceding load timing signal. In response to the cache-miss signal, the canceling circuit 211 drops a P stage valid signal of the subsequent instruction to be inputted into the selector 205. As a result, the subsequent instruction is canceled.

At subsequent timing, the instructions 5 and 8 are not issued. For example, in the comparator in the F stage of the instruction 2 of the fourth cycle==the scheduler 105, the controlling unit 105*g* refers to a cache miss signal with the F_cancel_code[1]==1 of the instruction 2.

Each instruction continues to wait for an arithmetic pipeline preceding load timing signal (cancelation information) from the P stage to the F stage in order to cancel the subsequent instructions to the own instruction. At the F stage, each instruction is compared with the subsequent instruction in the scheduler 105. At the issuing timing of the instruction 6 described above, an arithmetic pipeline preceding load timing signal is taken over from the arithmetic pipeline preceding load timing signal of the instruction 2 to the arithmetic pipeline preceding load timing signal of the instruction 6 in the third cycle.

Figure 18:
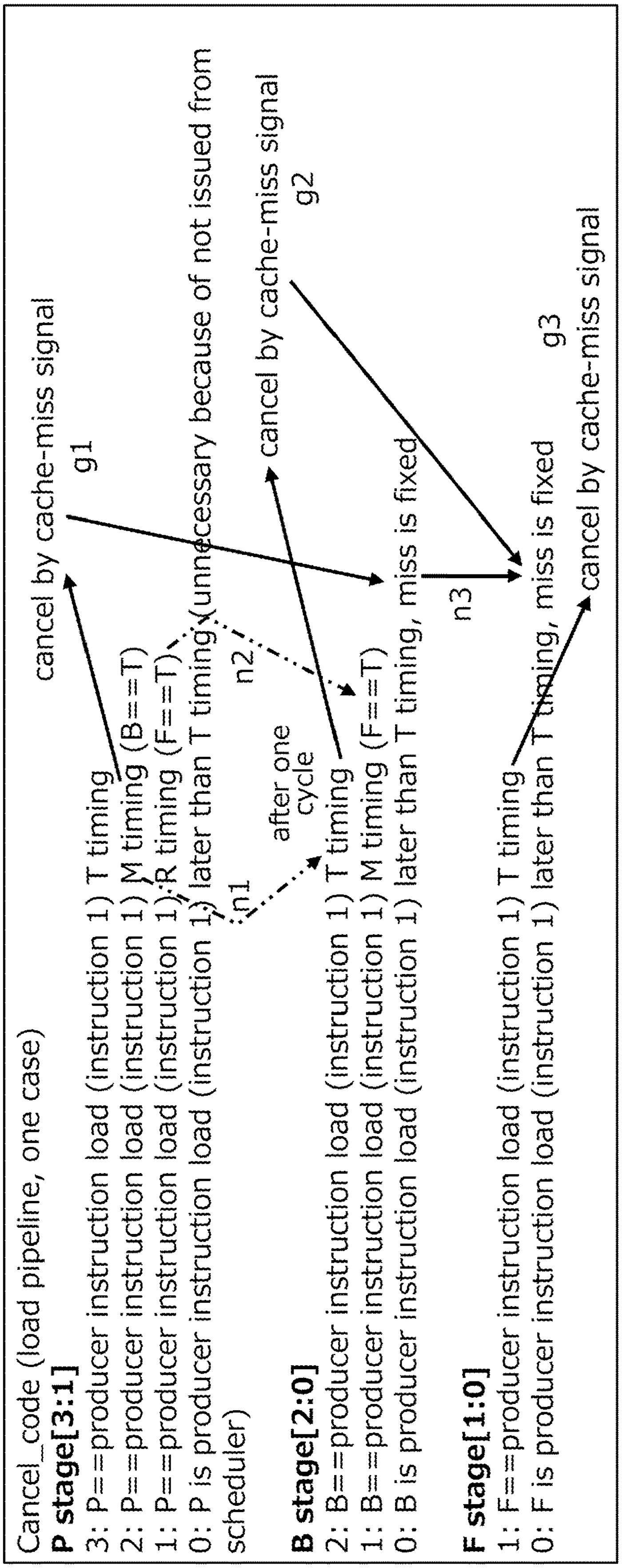
FIG. 18 is a diagram illustrating an example of an arithmetic-pipeline preceding load timing signal in a case where one load pipeline exits.

FIG. 18 is a diagram illustrating an example of an arithmetic pipeline preceding load timing signal (cancel_code) in a case where one load pipeline 109*b* exits. The respective values of the arithmetic pipeline preceding load timing signals may indicate the following states, for example. The reference signs n1-n3 and g1-g3 in the brackets correspond to the signal or the configuration of the same reference signs on FIG. 16.

when the P stage[3:1]

[3]: P==producer instruction load (instruction 1) T timing →Cancel with a cache-miss signal (g1)→B stage[0] one cycle later

[2]: P==producer instruction load (instruction 1) M timing (B==T)

→B stage[2] one cycle later (n1)

[1]: P==producer instruction load (instruction 1) R timing (F==T)

→B stage[1] one cycle later (n2)

[0]: P is later than the producer instruction load (instruction 1) T timing, and the miss has been fixed.

(unnecessary because of not being issued from scheduler 105)

when B stage[2:0]

[2]: B==producer instruction load (instruction 1) T timing →Cancel with a cache-miss signal (g2)→F stage[0] one cycle later

[1]: B==producer instruction load (instruction 1) M timing (F==T)

[0]: B is later than the producer instruction load (instruction 1) T timing, and the miss has been fixed.

→F stage[0] one cycle later (n3)

when F stage[1:0]

[1]: P==producer instruction load (instruction 1) T timing →Cancel with a cache miss signal (g3)

[0]: F is later than the producer instruction load (instruction 1) T timing, and the miss has been fixed.

As the above, for example, the code [3] of the 3-bit P stage cancel_code[3:1] indicates the T timing of the producer instruction load (instruction 1) of the P stage. In the examples of FIG. 17 and FIG. 18, the scheduler 105 issues the instruction 2 at the timing overlapping the T stage of the load in the F stage, using the cache miss fixing information (arithmetic pipeline preceding load timing signal) of the instruction 1, and makes a comparison in the fourth cycle. For example, the scheduler 105 cancels the instructions 6 to 8 after waiting for an arithmetic pipeline preceding load timing signal of the F stage of the producer instruction 2, the timing of the F cycle of the instruction 2, and the cache-miss determining signal of the instruction 1.

As described above, the dependency resolution determining unit 105*b* according to the comparative example includes a timing comparator for the T stage and the F stage in the cache-miss timing determining comparator circuits 303 and 304, a timing comparator for the T-R stage and the P stage, and a timing comparator for the B-F stage and P stage in the controlling unit 105*g*. These comparators undergo a rise in the comparison cost (e.g., mounting area) as the number of the pipelines increases.

FIG. 19 is a diagram illustrating an example of allocating the PS information 207 of the one embodiment. In FIG. 19, an example of allocation of the stage ID 208 for the loading pipeline 109*b* is represented by the reference symbol D in addition to the example of allocation of the stage ID 208 for the arithmetic pipeline 109*a*, represented by the reference symbol C in FIG. 11.

As indicated by reference symbol D in FIG. 19, the stage IDs 208 represented by {0, 1, 2, 3, 0} are allocated to the stages of the L and before, the R, the M, the T, and the W and after for the loading pipeline 109*b*. The stage_id [2:0]==0 of the stages of the L and before indicates a state where the dependency has not been resolved yet (dependency undetected), and the stage_id[2:0]==0 of the stages of the W and after indicates that data is read through the register 108. When an instruction is canceled due to a cache miss in a dependency chain of the preceding instructions or when a pipeline flush occurs, a stage ID 208 having a value stage_id[2:0]=0, which indicates that dependency is unresolved, may be set.

Figure 20:
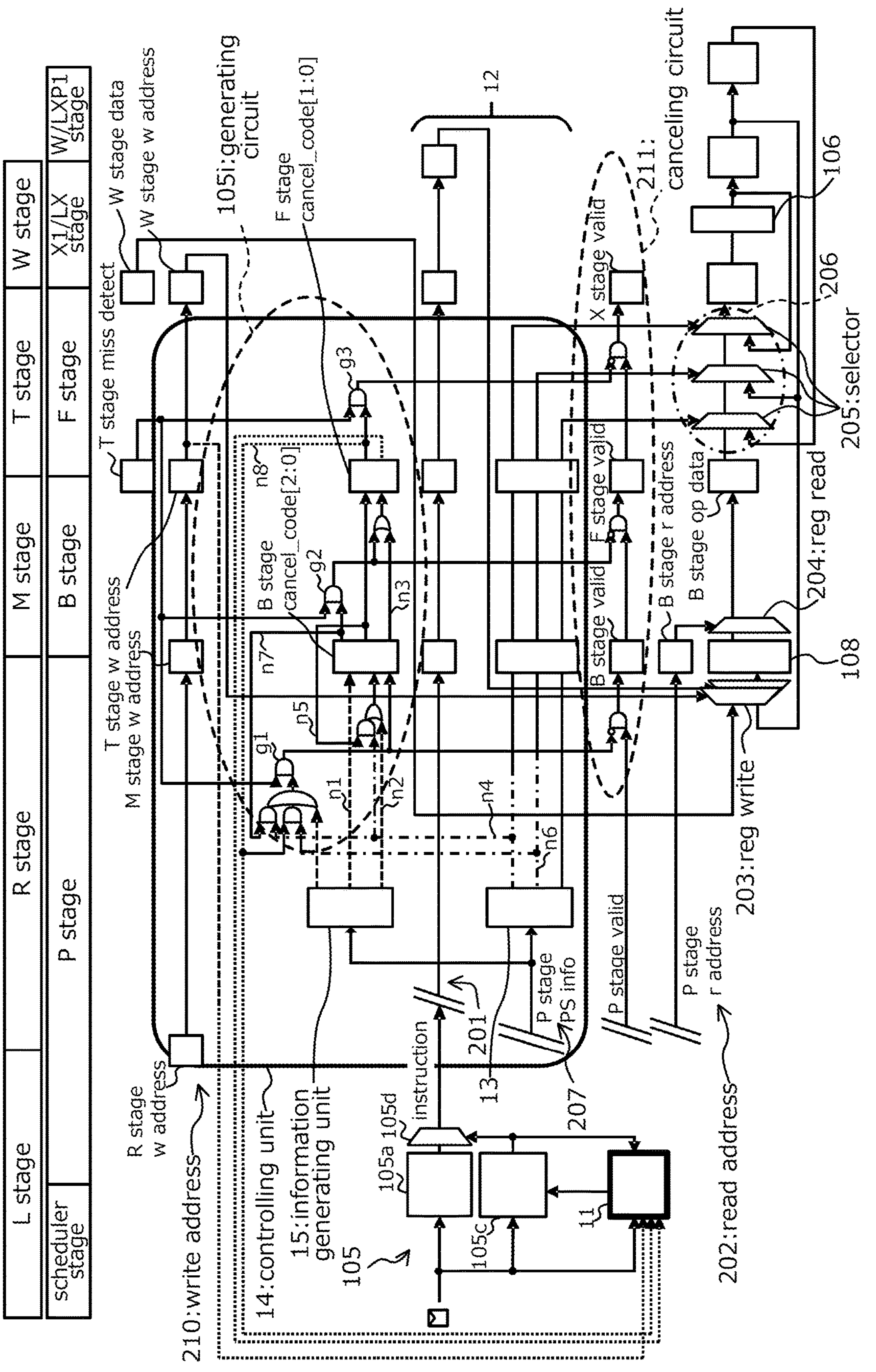
FIG. 20 is a diagram illustrating an example of the configuration to cancel a subsequent instruction in a dependency chain of a cache-miss load in the configuration of the core of the processor according to the one embodiment.

FIG. 20 is a diagram illustrating an example of a configuration to cancel a subsequent instruction in a dependency chain of a cache-miss load in the configuration of the core of the processor 1 according to the one embodiment. FIG. 21 is a diagram illustrating an example of determining cache-miss canceling according to the one embodiment. The value of the arithmetic pipeline preceding load timing signal, the issuing timing and the canceling timing of an instruction, and the like are the same as those of the comparative example.

As illustrated in FIG. 20, the core (e.g., the scheduler 105) of the processor 1 may include a controlling unit 14. The controlling unit 14 may include the forwarding unit 12 including the information generating unit 13, an information generating unit 15, and the generating circuit 105*i*. The core of the processor 1 may include the canceling circuit 211.

Since the pipeline stage illustrated in FIG. 20 is for loading, the PS information 207 inputted to the pipeline stage is used for the cache-miss canceling. For example, the PS information 207 may be used to specify the T cycle.

As illustrated in FIG. 21, the dependency resolution determining unit 11 determines dependency cancelation of the T cycle with stage id==3 & pipeline id==load & T cache miss. In addition, the dependency resolution determining unit 11 determines dependency cancelation of the F cycle with {(stage id==2 & f_latency==1)|(stage_id==1 & f_latency==2)}& {(F_cancel_code[1]&T_cache miss)|F cancel code[0]}& pipeline id==exec.

In the information generating unit 15, the controlling unit 14 obtains the PS information 207 as a determination result in the dependency resolution determining unit 11, specifies the loading pipeline 109*b* from the pipeline ID 209, and generates an arithmetic pipeline preceding load timing signal from the stage ID 208. The controlling unit 14 identifies the timing of the T cycle based on the arithmetic pipeline preceding load timing signal and the subsequent PS information 207. The controlling unit 14 then causes the canceling circuit 211 to cancel the subsequent instruction on the basis of a determination signal indicating the presence or absence of a cache miss in the T cycle.

As described above, the controlling unit 14 is an example of canceling control circuitry that cancels, when a preceding load instruction exists in a dependency chain of the producer instruction and the preceding load instruction results in a cache miss, all the instructions (subsequent series of instructions: subsequent chain instructions) in a subsequent dependency chain to the preceding load instruction. The cancelation may include setting a value (e.g., dropping opX_ready bit) representing negative in information (e.g., the opX_ready bit) representing whether the data dependency resolution on the all instructions in the subsequent dependency chain to the preceding load instruction succeeds in the canceling.

In addition, in the issuing control, the dependency resolution determining unit 11 can suppress control of erroneously issuing a consumer instruction by setting information for suppressing issuing of the consumer instruction in the PS information 207 related to the producer instruction (for example, by setting 0 in the stage ID 208).

As described above, according to one embodiment, the dependency resolution determining unit 11 replaces the cache-miss timing determining comparator circuits 303 and 304 with the cache-miss determining timing generation circuit 11*a* including a decoder, and includes the PS information updating circuit 11*b* including an encoder and an incrementor (updater) (see FIGS. 8 and 10). Thus, by replacing the comparators in the dependency resolution determining unit 105*b* with the decoder of the stage ID 208 and controlling the cancelation on the basis of the stage ID 208, the number of the comparators in the scheduler 105 can be reduced. Furthermore, in the pipeline, the comparators 105*h* can be omitted in addition to the comparators 105*f*.

(1-6) Example of Configuration for Updating Control of Inflight Condition Flag A CF (Condition Flag) is renamed like the register 108. The CF serving as an Architectural register is updated after committing (reordering).

The core of the processor 1 holds the CF in a Rename stage and updates the CF each time the CF comes into the Rename stage. A CF after the Rename stage is called an Inflight CF. The core holds a bit indicating whether to update the CF at the downstream of the scheduler 105 when the value of the Rename stage is not correct while speculatively executing the CF updating instruction, and controls updating of the CF.

The instruction refers to the CF of the Rename stage and if the updating instruction of the CF has been already executed, puts a value on the bit. If the updating instruction of the CF has not been executed, the core determines the pipeline and timing of the CF updating instruction, and captures and forwards the value of the CF in the scheduler 105 or the pipeline.

Figure 22:
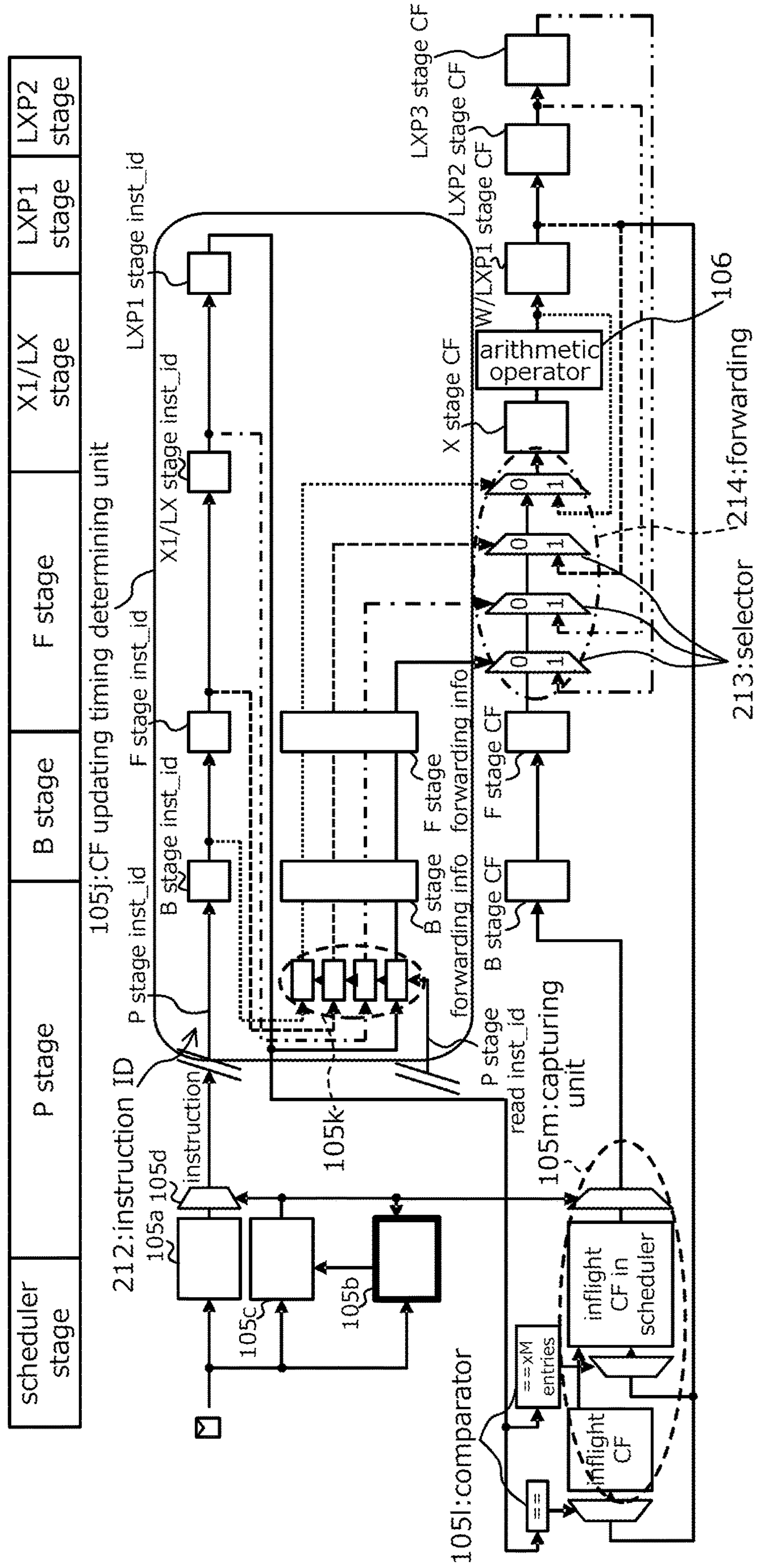
FIG. 22 is a diagram illustrating an example of a configuration focusing on a CF (Condition Flag) updating control in a configuration of the core of the processor according to the comparative example.

FIG. 22 is a diagram illustrating an example of a configuration focusing on a CF updating control in a configuration of the core of the processor 1 according to the comparative example. FIG. 22 assumes a case where the arithmetic latency is one cycle and the target operand is one.

As illustrated in FIG. 22, the core of the processor 1 (e.g., the scheduler 105) may include a CF updating timing determining unit 105*j* and a capturing unit 105*m*. The CF updating timing determining unit 105*j* includes comparators 105*k* that compare an instruction ID 212 with a read instruction ID. The capturing unit 105*m* includes a comparator 105*l*. The core also includes a selector 213 that selects a CF from the capturing unit 105*m* or a result of an arithmetic operation of the arithmetic operator 106 on the basis of the forwarding timing information from the comparators 105*k*.

In the CF updating timing determining unit 105*j*, the dotted line represents forwarding from the LX to the X stage, the dashed line indicates forwarding from the LXP1 to the F stage, and the one-dot dashed line indicates forwarding from the LXP2 to the F stage. The solid line represents forwarding from the LXP3 to the F stage.

FIG. 23 is a diagram illustrating an example of determining in the CF updating control according to the comparative example. The reference symbol A in FIG. 23 represents an example of a timing of an addeq instruction having latency of one cycle, and the reference symbol B represents an example of functions of the respective stages.

As indicated by the reference symbol B in FIG. 23, the C stage indicates a stage in which an inflight CF is read. The remaining stages are the same as in FIG. 12.

Cmp: r0, r1 indicated by the reference symbol A compares the values of r0 and r1 and outputs a CF representing "equal" if the two compared values match and outputs a CF representing "not equal" if the two compared values do not match. The core does not write the result into the register 108 in response to the cmp instruction, but only updates the CF held by the scheduler 105. The inflight CF and a CF in an inflight CF field of the subsequent CF reading dependent instruction in the scheduler 105 are also updated. The CF serving as an Architectural register is updated after committing. In addition, Inflight resource held by the scheduler 105 is updated in the LXP1. For example, the scheduler 105 controls the CF like register renaming using the Inflight resource.

Since a cmp instruction is an instruction for updating the CF and the addeq instruction is an instruction for reading the CF, the cmp instruction and the addeq instruction have dependency.

In the example of FIG. 23, at the timings from the instruction 1 (cmp instruction) to the instructions 2 to 5 (addeq instructions), the forwarding 214 is performed on the path of the comparators 105*k* and the selector 213. At and after the timing from the instruction 1 to the instruction 7 (addeq instruction), the Inflight CF is read through the capturing unit 105*m*. For example, a comparator 105*l* is provided for capturing the LXP1 timing of the instruction 1 and updating the Inflight CF.

As the above, in the comparative example, the comparator 105*k* that identifies a timing is used to capture the writing timing.

In addition, since the dependency of the CF is different from the lifetime of the register 108, the capturing unit 105*m* holds a dedicated control bit and manages whether the CF is forwarded from the pipeline. To hold this information, the capturing unit 105 uses the comparator 105*l* dedicated to checking of the timing.

In the above-described updating control of the CF, when the number of pipelines, the number of stages of the pipeline, and the like increase, the number of comparators for determining the pipeline and the timing of a CF updating instruction in the queue and the pipeline (forwarding unit 105*e*) of the scheduler 105 also increases.

Figure 24:
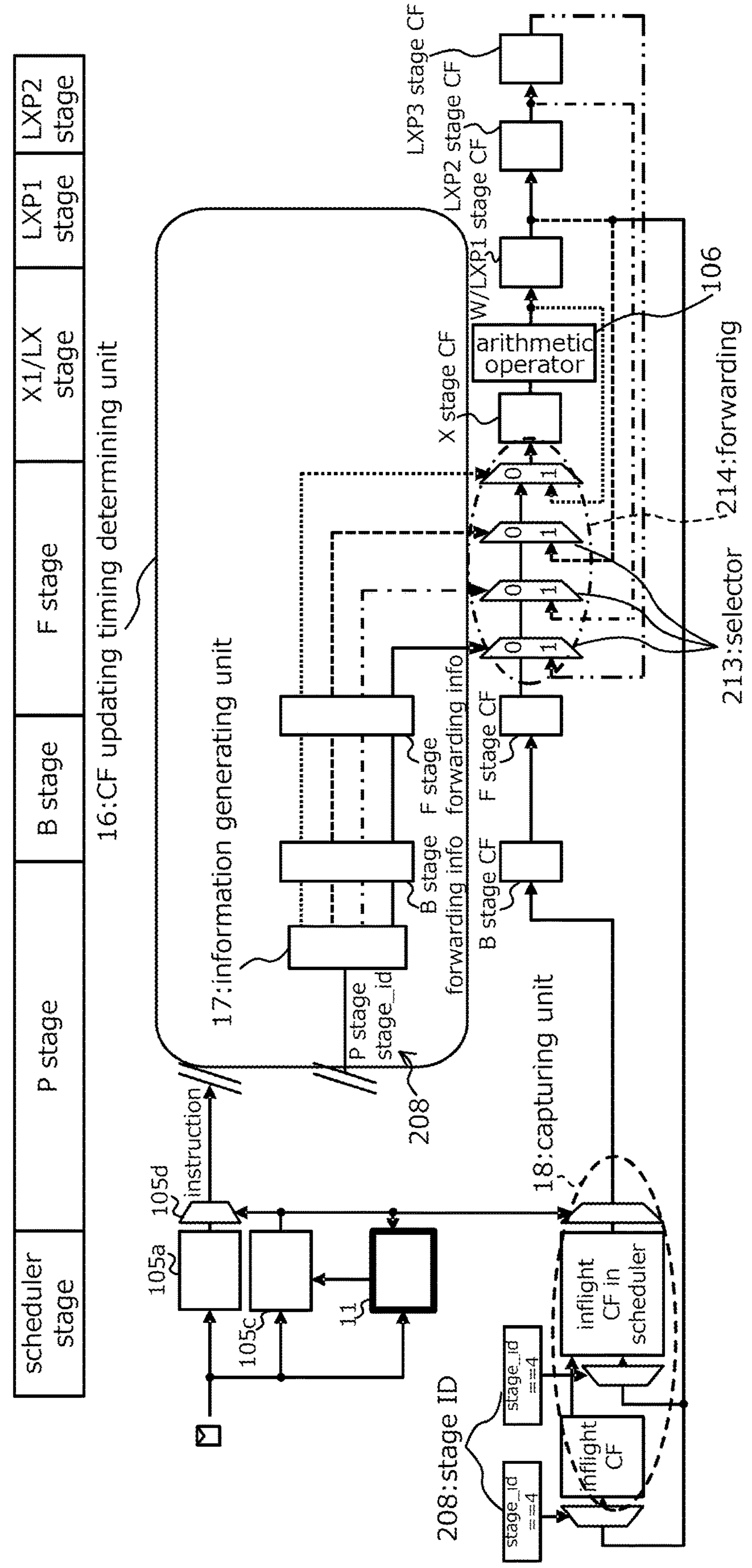
FIG. 24 is a diagram illustrating an example of a configuration focusing on a CF updating control in a configuration of the core of the processor according to the one embodiment.

FIG. 24 is a diagram illustrating an example of a configuration focusing on a CF updating control in a configuration of the core of the processor 1 according to the one embodiment. FIG. 24 assumes a case where the arithmetic latency is one cycle and the target operand is one.

As illustrated in FIG. 24, the core of the processor 1 (e.g., the scheduler 105) may include a CF updating timing determining unit 16 and a capturing unit 18. The CF updating timing determining unit 16 includes an information generating unit 17 that generates forwarding information based on the stage ID 208. The capturing unit 18 includes an input of the stage ID 208 in place of the comparator 105*l*. The core also includes a selector 213 that selects a CF from the capturing unit 18 or a result of an arithmetic operation of the arithmetic operator 106 on the basis of the forwarding timing information from the information generating unit 17.

In the CF updating timing determining unit 16, the dotted line represents forwarding from the LX to the X stage, the dashed line indicates forwarding from the LXP1 to the F stage, and the one-dot dashed line indicates forwarding from the LXP2 to the F stage. The solid line represents forwarding from the LXP3 to the F stage.

FIG. 25 is a diagram illustrating an example of determining in the CF updating control according to the one embodiment. The reference symbol A in FIG. 25 represents an example of timings of addeq instructions having latency of one cycle, and the reference symbol B represents an example of functions of the respective stages.

In the example of FIG. 25, at the timings from the instruction 1 (cmp instruction) to the instructions 2 to 5 (addeq instructions), the forwarding 214 is performed on the path of the information generating unit 17 and the selector 213. Since the timing from the instruction 1 (cmp instruction) to the instruction 6 (addeq instruction) is the P stage after the update of the CF in the scheduler 105 and the instruction 6 is issued after the capturing (reading) of the CF by the capturing unit 18, the forwarding 214 is dispensable. At and after the timing from the instruction 1 to the instruction 7 (addeq instruction), the Inflight CF is read through the capturing unit 18.

As described above, the CF updating timing determining unit 16 is an example of updating control circuitry that controls, based on the PS information 207, updating of an Inflight Condition Flag.

As described above, in addition to forwarding, the PS information 207 can be applied to one or both of cancelation of a subsequent instruction in a dependency chain of a cache-miss load and the updating control of the CF, and a comparator can be omitted in each of them.

(2) Miscellaneous

The technique related to the above one embodiment can be changed and modified as follows.

The one embodiment assumes that the scheduler 105 makes the comparison at the P stage, but the comparing timing is not limited to this. The comparison may be performed any time before the forwarding timing.

In addition, the information generating unit 13, 17 generates the forwarding information based on PS information 207 in the P stage, but the generating timing is not limited to this. Alternatively, the generating timing may be any stage that makes it to the forwarding or capturing timing.

Further, various comparators illustrated as comparative examples are the same when a CAM is used.

The stage ID 208 of the preceding instruction allocated for each operand or a CF is assumed to be a count-up counter, but is not limited to this. Alternatively, the stage ID 208 may be a count-down counter. Further alternatively, the stage ID 208 may be of various types of information, so far as it can identify pipelines and stages.

In one aspect, it is possible to reduce the circuit scale of an arithmetic processing apparatus that executes instructions in parallel and sequentially from executable instructions.

Throughout the descriptions, the indefinite article "a" or "an", or adjective "one" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An arithmetic processing apparatus comprising:

a queue; and control circuitry, wherein the arithmetic processing apparatus executes a plurality of instructions in parallel and sequentially from executable instructions, the queue stores the plurality of instructions, and the control circuitry holds an indicator indicating a pipeline that executes a producer instruction included in the plurality of instructions and uniquely identifying an execution stage on the pipeline of the producer instruction from which a result of an operation is to be forwarded, the pipeline has multiple types of latency, and the control circuitry executes data dependency resolution between the producer instruction and a consumer instruction that uses an execution result of the producer instruction and that is included in the plurality of instructions and controls issuing timings of the plurality of instructions, wherein the queue stores a plurality of consumer instructions, and the control circuitry holds a plurality of indicators each indicating the pipeline of the producer instruction for each of the plurality of consumer instructions, wherein the indicator comprises:

pipeline identification information of the pipeline to which the producer instruction is issued; and stage identification information uniquely allocated to each stage, of stages from a stage corresponding to a first issuing timing at which the result of the operation is forwarded from the producer instruction to the consumer instruction at a shortest forwarding timing to a stage corresponding to a second issuing timing at which the result of the operation is stored in a register and comes to be ready to be read by the consumer instruction, and wherein:

the stage identification information is set at a first cycle earlier by a first given number of cycles than a last cycle at which the producer instruction is executed, and is reset at a second cycle later by a second given number of cycles than the last cycle; and unique identifiers are allocated one to each of one or more cycles from the first cycle to the second cycle.

2. The arithmetic processing apparatus according to claim 1, wherein the control circuitry generates a plurality of indicators one for each entry of the queue and each operand of the plurality of instructions in relation to each of a plurality of producer instructions.

3. The arithmetic processing apparatus according to claim 2, wherein the control circuitry executes the data dependency resolution, using the indicator retained in each operand of the plurality of instructions.

4. The arithmetic processing apparatus according to claim 1, further comprising forwarding control circuitry that forwards, based on the indicator, the result of the operation of the producer instruction to an operand of the consumer instruction, the consumer instruction being issued to a pipeline that executes the consumer instruction at a timing according to the control by the control circuitry.

5. The arithmetic processing apparatus according to claim 1, further comprising canceling control circuitry that cancels, when a preceding load instruction exists in a dependency chain of the producer instruction and the preceding load instruction results in a cache miss, all instructions in a subsequent dependency chain to the preceding load instruction, the canceling being based on the indicator.

6. The arithmetic processing apparatus according to claim 5, wherein the canceling control circuitry sets information representing whether the data dependency resolution succeeds or not to a value indicating that, due to the cache miss causing data dependency resolution failure, each producer instruction is awaiting re-issue by the control circuitry, on all instructions in the subsequent dependency chain to the preceding load instruction, in the canceling.

7. The arithmetic processing apparatus according to claim 1, further comprising updating control circuitry that controls, based on the indicator, updating of an Inflight Condition Flag.

8. A method for arithmetic processing in an arithmetic processing apparatus that executes a plurality of instructions in parallel and sequentially from executable instructions, the method comprising:

at a scheduler provided in the arithmetic processing apparatus, storing, in a queue, the plurality of instructions being accepted; and holding an indicator indicating a pipeline that executes a producer instruction included in the plurality of instructions stored in the queue and uniquely identifying an execution stage on the pipeline of the producer instruction from which a result of an operation is to be forwarded, the pipeline having multiple types of latency;

executing data dependency resolution between the producer instruction and a consumer instruction that uses an execution result of the producer instruction and that is included in the plurality of instructions; and controlling issuing timings of the plurality of instructions, wherein the storing comprises storing, in the queue, a plurality of consumer instructions, and wherein the holding comprises holding a plurality of indicators each indicating the pipeline of the producer instruction for each of the plurality of consumer instructions, wherein the indicator comprises:

pipeline identification information of the pipeline to which the producer instruction is issued; and stage identification information uniquely allocated to each stage, from a stage corresponding to a first issuing timing at which the result of the operation is forwarded from the producer instruction to the consumer instruction at a shortest forwarding timing to a stage corresponding to a second issuing timing at which the result of the arithmetic operation is stored in a register and comes to be ready to be read by the consumer instruction, and wherein:

the stage identification information is set at a first cycle earlier by a first given number of cycles than a last cycle at which the producer instruction is executed, and is reset at a second cycle later by a second given number of cycles than the last cycle; and unique identifiers are allocated one to each of one or more cycles from the first cycle to the second cycle.

9. The method according to claim 8, further comprising at the scheduler, generating a plurality of indicators one for each entry of the queue and each operand of the plurality of instructions in relation to each of a plurality of producer instructions.

10. The method according to claim 9, further comprising at the scheduler, executing the data dependency resolution, using the indicator retained in each operand of the plurality of instructions.

11. The method according to claim 8, further comprising at the scheduler, forwarding, based on the indicator, the result of the operation of the producer instruction to an operand of the consumer instruction, the consumer instruction being issued to a pipeline that executes the consumer instruction at a timing according to the controlling.

12. The method according to claim 8, further comprising at the scheduler, detecting a cache miss of a preceding load instruction in a dependency chain of the producer instruction, and canceling all instructions in a subsequent dependency chain to the preceding load instruction, the canceling being based on the indicator.

13. The method according to claim 12, further comprising at the scheduler, setting information representing whether the data dependency resolution succeeds or not to a value indicating that, due to the cache miss causing data dependency resolution failure, each producer instruction is awaiting re-issue by the scheduler, on all instructions in the subsequent dependency chain to the preceding load instruction, in the canceling.

14. The method according to claim 8, further comprising at the scheduler, controlling, based on the indicator, updating of an Inflight Condition Flag.

* * * * *